US007062509B1

(12) United States Patent
Nenov et al.

(10) Patent No.: US 7,062,509 B1
(45) Date of Patent: Jun. 13, 2006

(54) SYSTEM AND METHOD FOR PRODUCT DATA STANDARDIZATION

(75) Inventors: Dejan N. Nenov, San Francisco, CA (US); Yongwon Lee, San Jose, CA (US); Todd J Gettelfinger, Chicago, IL (US); Shermann L. Min, Pacifica, CA (US); Dawn T. Ohlendorf, Redwood City, CA (US); Donna B. Tobias, Portola Valley, CA (US); John R. Gilmer, II, San Anselmo, CA (US)

(73) Assignee: Instill Corporation, Redwood City, CA (US)

( * ) Notice: Subject to any disclaimer, the term of this patent is extended or adjusted under 35 U.S.C. 154(b) by 0 days.

(21) Appl. No.: 09/576,366

(22) Filed: May 22, 2000

(51) Int. Cl.
*G06F 7/00* (2006.01)
*G06F 17/00* (2006.01)
*G06F 17/30* (2006.01)

(52) U.S. Cl. .................. 707/104.1; 707/4; 707/102

(58) Field of Classification Search ............ 707/104, 707/104.1, 4, 102, 10; 705/28, 27, 14; 235/383
See application file for complete search history.

(56) References Cited

U.S. PATENT DOCUMENTS

| | | | | |
|---|---|---|---|---|
| 5,315,093 A | * | 5/1994 | Stewart | 235/381 |
| 5,665,953 A | * | 9/1997 | Mazzamuto et al. | 235/383 |
| 5,726,898 A | * | 3/1998 | Jacobs | 700/231 |
| 5,822,736 A | * | 10/1998 | Hartman et al. | 705/1 |
| 5,912,986 A | * | 6/1999 | Shustorovich | 382/156 |
| 6,035,284 A | * | 3/2000 | Straub et al. | 705/28 |
| 6,134,557 A | * | 10/2000 | Freeman | 707/102 |
| 6,366,926 B1 | * | 4/2002 | Pohlmann et al. | 707/104.1 |
| 6,430,554 B1 | * | 8/2002 | Rothschild | 707/3 |
| 6,466,948 B1 | * | 10/2002 | Levitsky et al. | 707/104.1 |

OTHER PUBLICATIONS

Xiao-Hong Peng and P.G. Farrell (1997), Trellises for Product Codes and Their Augmenting Codes.*

* cited by examiner

*Primary Examiner*—Safet Metjahic
*Assistant Examiner*—Merilyn Nguyen
(74) *Attorney, Agent, or Firm*—Townsend and Townsend and Crew LLP

(57) ABSTRACT

A computer system is provided for generating standardized product data. The computer system includes a database which maintains data for a plurality of known products, each known product associated with a respective standardized product code. A processing facility, coupled to the database, receives raw data for an unidentified product from a plurality of diverse data sources, each of which has its own separate identifier for the unidentified product. The processing facility compares the raw data for the unidentified product against the data for the plurality of known products. If there is a match between the raw data for the unidentified product and the data for one of the plurality of known products, the processing facility assigns the respective standardized product code of the matching known product to the unidentified product.

37 Claims, 15 Drawing Sheets

```
ISA*00*          *00*          *08*925591000      *ZZ*DELW
*991213*2143*U*00300*000000642*0*P*^@GS*IN*281584115G*DELW*991213*2143*385*X*00302@ST*810*0
00385001@BIG*991218*912100372*****DI@REF*UR*05109966I@N1*ST*CA ONE
SERVICES*92*000013999@N3*9175 E CLINTON AVE*CONCESSION
AIR@N4*FRESNO*CA*93727000@REF*CR*000013999@N1*SF*MODESTO*9*028686679@N3*P.O.BOX 729*136
MARIPOSA
ROAD@N4*MODESTO*CA*95354@IT1*NT*1*CA*13.93***UN*104012 G***CB*6185*TP*06010510@CTP**T0T*13.93@
PID*F****BISCUIT BTRMLK RND 3"@PKG*F*PK***
100@PKG*F*UP***2.2502@REF*CH*000478*BRIDGFORD@REF*PA*400186*BRIDGEFORD@REF*CO*100102*BRIDGEF
ORD@REF*PG*BRDGFRD@IT1*NT*10.911*LB*1.415***UN*1159096***CB*01824*TP*02040801@QTY*01*1*EA@CTP
**TOT*15.44@PID*F****CHEESE MONTEREY JACK PRINT@PKG*F*PK***
4@PKG*F*UP***10@AUG@P04*4****G*46.81*31@REF*CH*009962@REF*PG*PACKER@IT1*NT*1*CA*12.07***UN*14
4895 0****CB*11115182 00*TP*02030201@CTP**TOT*12.07@PID*F****MARGARINE SPREAD CUP@PKG*F*PK***
60@PKG*F*UP***5
GM@REF*CH*002184*LIPTON@REF*PA*400510*LIPTON@REF*CO*100488*UNILEVER@REF*PG*PROMISE@IT1*NT*2*
CA*16.5***UN*1455 039****CB*01875 0*TP*03040303@CTP**TOT*33@PID*F****SAUSAGE PORK PTY
PRECOOKED@PKG*F*PK***     8@PKG*F*UP***2 OZ@REF*CH*01933*JONES DAIRY FARM@REF*PA*401987*JONES
DAIRY FARM@REF*CO*101717*JONES DAIRY FARM@REF*PG*JONES
D@IT1*NT*1*CA*16.83***UN*1590660****CB*5206S*TP*06020106@CTP**TOT*16.83@PID*F****ONION RING
BEER BTR 5/8 IN@PKG*F*PK***    4@PKG*F*UP***2.5 LB@REF*CH*000174*ANCHOR FOOD
PRODUCTS@REF*PA*400036*ANCHOR FOOD PRODUCTS@REF*CO*100036*ANCHOR FOOD PRODUCTS@REF*PG*SYS
IMP@IT1*NT*19.119*LB*2.873***UN*1874957****TP*02040801@QTY*01*2*EA@CTP**TOT*54.93@PID*F****C
HEESE SWISS LOAF GRADE A@PKG*F*PK***
6@PKG*F*UP***8-9@AU@P04*6****G*54.6*31@REF*CH*009962@REF*PG*CACHULY@IT1*NT*1*CA*41.79***UN*23
68769****CB*5017*TP*03040701@CTP**TOT*41.79@PID*F****PEPPERONI SLICED 14-16 CT@PKG*F*PK***
2@PKG*F*UP***12.5LB@REF*CH*004068*FOODBRANDS AMERICA INC@REF*PA*400433*IOWA BEEF
PROCESSORS@REF*CO*100415*IOWA BEEF
PROCESSORS@REF*PG*AREZZIO@IT1*NT*1*CA*35.06***UN*2623049****CB*445*TP*07190199@CTP**TOT*35.06@
PID*F****SYRUP CHOCOLATE@PKG*F*PK***    6@PKG*F*UP***#10@REF*CH*002236*LYONS
MAGNUS@REF*PA*401950*LYONS MAGNUS@REF*CO*101681*LYONS MAGNUS@REF*PG*SYS
IMP@IT1*NT*4*CA*8.85***UN*4005104****CB*12281*TP*07380101@CTP**TOT*35.4@PID*F****FRITO LAY@REF*PA*400433*
RIDGED REG@PKG*F*PK***    6@PKG*F*UP***16 OZ@REF*CH*001360*FRITO LAY@REF*PA*401360*FRITO
```

Batch: USFOODS_BROCK 200002 (2000-02-01 ~ 2000-03-01)

Manufacturer (Assignment) Audit (step 1-2)

Target

| AUDIT | MFC | RAWMFCNAME | BRAND | PRODUCTID | PRODUCTNAME | PRODUC | DISTRI | PACK | PACKSIZE |
|---|---|---|---|---|---|---|---|---|---|
| | GENERAL | 0011050 | GMEDAL | 501461285 | MUFFIN MIX LEMON POPPY | 91576 | 81103 | 00000 | 5LB 3OZ |
| | GENERAL | 0011050 | GMILLS | 501518761 | GUSHERS STRAWBERRY | 91576 | 81103 | 00000 | 9 OZ |

Buttons: Assign, Clean, Pass, SendBack, Unknown, Reference, NextBatch

Note area : Maximum 256 characters

☑ Show Gues...

2 items

Possible Matches

| MFCID | BRAND | BRANDID | BRANDNA | DCID | DIST | MFCNAME | PCATEGO |
|---|---|---|---|---|---|---|---|
| 6780 | GMEDAL | 21231 | AL-TRUM | 91576 | 81103 | GENERAL | |
| 7780 | GMEDAL | 23376 | CF SAUER | 81102 | 81103 | CF SAUER | |
| 7780 | GMEDAL | 23376 | CF SAUER | 81205 | 81103 | CF SAUER | |
| 6780 | GMEDAL | 21241 | GENERAL | 81205 | 81103 | GENERAL | |
| 6780 | GMEDAL | 1002689 | GOLD ME... | 81102 | 81103 | GENERAL | |
| 6780 | GMEDAL | 1002689 | GOLD ME... | 81205 | 81103 | GENERAL | |
| 6780 | GMEDAL | 1002689 | GOLD ME... | 91576 | 81103 | GENERAL | |

SYSTEM AND METHOD FOR PRODUCT DATA STANDARDIZATION

TECHNICAL FIELD OF THE INVENTION

The present invention relates generally to the field of computers and, more particularly, to a system and method for product data standardization.

BACKGROUND OF THE INVENTION

In general, meals which are "prepared away from home" are provided by the food service industry. The food service industry involves a number of different entities or participants, including manufacturers, distributors, and operators. Manufacturers—such as, for example, dairies, bakeries, and farms—produce the products from which meals are prepared. Distributors act as "middle men" to consolidate the products from a number of manufacturers and deliver the same to operators. Operators—which include restaurants, hotels, school cafeterias, airlines, etc.—use the products to actually prepare and/or serve meals to consumers. Operators may have multiple locations or "units" at which services are rendered or provided (i.e., where meals are prepared and/or made available to the consumers).

Although the food service industry represents a significant share of all retail food sales, it is rife with inefficiencies. The greatest challenge the food service industry faces today is streamlining all areas of the supply chain to improve the profitability of all the participants (e.g., operators, distributors, and manufacturers). For example, for multi-unit food service operators, food is the most important raw material for business, and thus, its purchase is a mission-critical, strategic operation. In the low-margin food service industry, reducing food costs by one percent can yield a twenty percent or more increase in revenue. Operators may thus seek volume discounts for products of a particular manufacturer or distributor. Furthermore, operators may establish "preferred" suppliers (manufacturers or distributors) from which products should be ordered. Distributors and manufacturers, too, can leverage efficient purchasing initiatives to drive down their costs and compete more effectively.

In order to implement more effective and efficient purchasing strategies, participants require particular information. To date, this type of information—commonly available in retail/consumer segments (e.g., grocery industry)—has been absent from the food service industry. Specifically, a major technical impediment to seamless transaction and information flow between trading partners in the food service industry has been a lack of standards for identifying products. In the grocery industry, which is generally responsible for food "prepared at home," almost any given item is identifiable by respective standard universal product code (UPC) that is understood and accepted at any point in the supply chain, including any checkout scanner. In the food service industry, however, the same item may be described in a number of different ways by various distributors who supply the item to operators. For each distributor, the same item may carry a different product description, manufacturer identifier, product number, pack, and size description.

Without unified, multi-distributor purchase management reporting and analysis, food service operators cannot proactively manage purchasing activities or move forward with initiatives (e.g., volume discounts or rebates) that positively impact company profitability. For food service operators, purchasing is the daily mission-critical job that can mean the difference between profit and loss, especially for multi-unit operators which must coordinate purchases from multiple locations with multiple vendors. Corporate purchasing standards need to be controlled across all units to ensure consistent food quality and to obtain the maximum in volume buying power. But the lack of consistency in product information makes it difficult to bring new efficiencies and control to the purchasing process. For example, off-contract purchases undermine the buying efforts but are difficult to detect or prevent.

This lack of consistency in product information also presents a major barrier to food service manufacturers. Without a single, consistent standard identifier for its products throughout the food service channels, manufacturers are stymied in their efforts to track purchasing patterns, market share statistics, promotional activities, and more. Instead of a single identifier, there are a myriad of identifiers for identical products, making data aggregation a time-consuming, error-prone nightmare for business analysts. Without the basic data foundation, manufacturers have had to rely on educated guesses and hunches about what the best markets are for their products and how their products compare against the competition.

SUMMARY OF THE INVENTION

In order for participants in the food service industry to optimize efficiency in their operations, for example, in the areas of marketing, distribution, and purchasing, the present invention provides a computer system and method for standardizing the raw data generated by diverse data sources during the movement of products across various supply chains. The system and method standardizes product data, identifying manufacturers and brands of products described in many different formats and assigning appropriate standardized product codes. That is, the system and method generate standardized product data in which similar products are identified by the same identifier or description. Standardized product data is critical for streamlining the supply chains for products in the food service industry.

According to an embodiment of the present invention, a computer system is provided for generating standardized product data. The computer system includes a database which maintains data for a plurality of known products, each known product associated with a respective standardized product code. A processing facility, coupled to the database, receives raw data for an unidentified product from a plurality of diverse data sources, each of which has its own separate identifier for the unidentified product. The processing facility compares the raw data for the unidentified product against the data for the plurality of known products. If there is a match between the raw data for the unidentified product and the data for one of the plurality of known products, the processing facility assigns the respective standardized product code of the matching known product to the unidentified product.

According to another embodiment of the present invention, a method performed on a computer system is provided for generating standardized product data. The method includes the following steps: maintaining data for a plurality of known products, each known product associated with a respective standardized product code; receiving raw data for an unidentified product from a plurality of diverse data sources, each data source having its own separate identifier for the unidentified product; comparing the raw data for the unidentified product against the data for the plurality of known products; and if there is a match between the raw data for the unidentified product and the data for one of the plurality of known products, assigning the respective standardized product code of the matching known product to the unidentified product.

According to yet another embodiment of the present invention, a computer system for generating standardized product data includes a database operable to maintain data for a plurality of known products, each of which is associated with a respective standardized product code. The data maintained in the database comprises a separate stored description and set of field values for each of the known products. A processing facility, coupled to the database, receives raw data for an unidentified product from a plurality of diverse data sources, each of which has its own separate identifier for the unidentified product. The raw data comprises a raw description and set of field values for the unidentified product. The processing facility compares the raw description for the unidentified product against the stored descriptions for each of the known products. If the raw description for the unidentified product does not match any of the stored descriptions for the known products, the processing facility compares a predetermined combination of the field values for the unidentified product against corresponding field values for each of the known products. If the raw description for the unidentified product matches a stored description for one of the known products, or alternatively, if all of the field values for the unidentified product match the corresponding field values for one of the known products for the predetermined combination, the processing facility assigns the respective standardized product code of the matching known product to the unidentified product.

A technical advantage of the present invention includes providing a system and method which are able to assign a standardized product code identifier to identical products described in raw data received from a plurality of diverse data sources, each source having its own separate description for the products. Because identical products are given the same identifier, an operator can monitor the performance of its distributors with reports that track deliveries, substitutions, shorts and other statistics for individual distributors. In addition, operators can consolidate all of their food buying activities into a single, unified purchasing process. Furthermore, with the standardized product data generated by the system and method of the present invention, manufacturers are able to more readily track purchasing patterns, market share statistics, promotional activities, etc.

Another technical advantage of the present invention includes providing multiple levels of automated matching to identify products specified in raw data and to assign appropriate standardized product codes to the identified products. These levels of matching include signature match, a combination match, and a pattern match. In a signature match, a raw description or "signature" for an unidentified product specified in raw data is compared to the signatures of known products. In a combination match, various field values in the raw data for an unidentified product are compared against the field values of known products for one or more predetermined combinations of fields. In a pattern match, partial matches are calculated—i.e., the field values for an unidentified product are compared against the field values of various known products to determine the fractional similarity therebetween. The multiple levels of automated matching are designed to reduce or eliminate the need for manual analysis to identify a particular product specified in raw data. That is, manual analysis is required only if a product cannot be identified by one of the levels of automated matching.

Yet another technical advantage of the present invention includes providing a system and method which use a pattern match for identifying products. In a pattern match, for each of a number of fields, a comparison is made to gauge the similarity between the field value of an unidentified product and the field value of a known product. If there is sufficient similarity between values for each of the fields, the unidentified product can be identified as the known product. This is the case even if the values are not exact (i.e., Boolean) matches in each field. The pattern match of fields affords several benefits. Close matches are no longer viewed as mismatches. Because the system and method are able to determine close (albeit, not exact) matches, more products can be automatically identified. The unidentified products requiring manual attention will be limited to only those that have field values with significant differences to all known products. Furthermore, the pattern match eliminates the need to maintain data for every single variation of field value, as would be required for a Boolean comparison. This improves system performance.

Other aspects and advantages of the present invention will become apparent from the following descriptions and accompanying drawings.

BRIEF DESCRIPTION OF THE DRAWINGS

For a more complete understanding of the present invention and for further features and advantages, reference is now made to the following description taken in conjunction with the accompanying drawings, in which:

FIG. 6 illustrates exemplary raw data in flat file format;

FIG. 7 illustrates an exemplary screen display for manufacturer assignment and audit, according to an embodiment of the present invention;

FIG. 8 illustrates an exemplary screen display for standardized product code assignment and audit, according to an embodiment of the present invention;

FIG. 9 illustrates an exemplary screen display for standardized product code creation, according to an embodiment of the present invention;

DETAILED DESCRIPTION OF THE PREFERRED EMBODIMENTS

Figure 1:
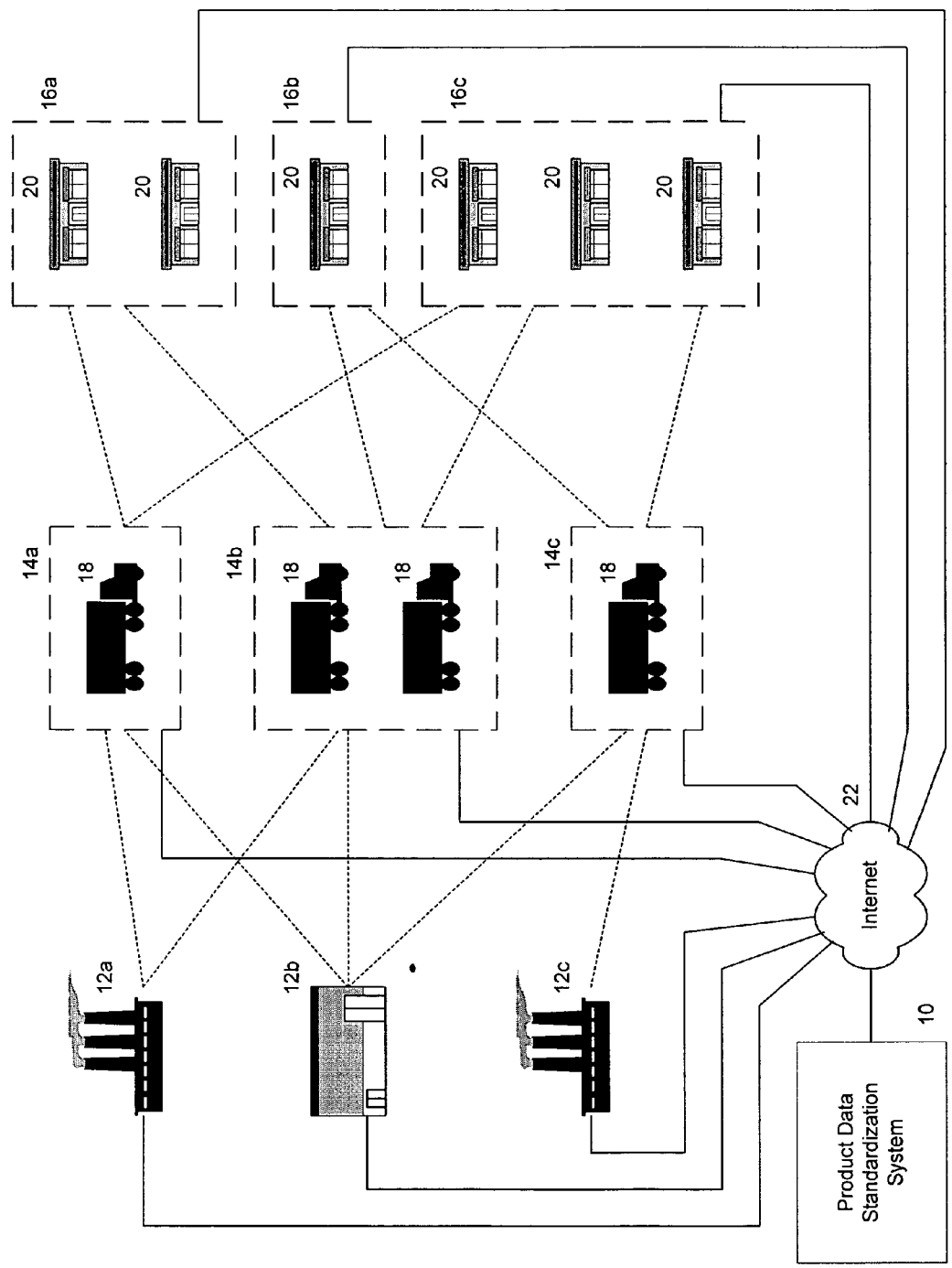
FIG. 1 illustrates an exemplary environment in which a product data standardization system, according to an embodiment of the present invention, may operate.

The preferred embodiments of the present invention and their advantages are best understood by referring to FIGS. 1–15 of the drawings. Like numerals are used for like and corresponding parts of the various drawings.

Turning first to the nomenclature of the specification, the detailed description which follows is represented largely in terms of processes and symbolic representations of operations performed by conventional computer components, such as a local or remote central processing unit (CPU) or processor associated with a general purpose computer system, memory storage devices for the processor, and connected local or remote pixel-oriented display devices. These operations include the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of this discussion, a process, method, routine, or sub-routine is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, searching, or the like, which are often associated with manual operations performed by a human operator. It must be understood that no involvement of the human operator may be necessary, or even desirable, in the present invention. The operations described herein are machine operations performed in conjunction with the human operator or user that interacts with the computer or computers.

In addition, it should be understood that the programs, processes, methods, and the like, described herein are but an exemplary implementation of the present invention and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as read-only memory (ROM).

Supply Chains for the Food Service Industry

Referring now to the drawings, FIG. 1 illustrates an exemplary environment in which a product data standardization system 10, according to an embodiment of the present invention, may operate. In particular, FIG. 1 depicts a number of supply chains formed by various participants of the food service industry, including manufacturers 12 (separately labeled 12a, 12b, and 12c), distributors 14 (separately labeled 14a, 14b, and 14c), and operators 16 (separately labeled 16a, 16b, and 16c).

Manufacturers manufacture or produce the products which are moved in the supply chains for the food service industry. These products may include any consumable items which are used in the preparation and/or service of meals "prepared away from home." For example, the products may include food, such as, flour, milk, eggs, meat, poultry, fish, vegetables, fruit, bread, condiments, processed sauces, seasonings, etc. The products may also include serving items, such as, plates, glasses, cups, china, utensils, serving trays, napkins, tablecloths, take-out containers, etc. Although some of the products may have a universal product code (UPC) symbol by which they can be identified, many of the products do not. For example, a bottle of ketchup of a certain size from a particular manufacturer may have a UPC symbol, but a plate may not.

Distributors 14 consolidate and distribute the products from a number of manufacturers 12. In many instances, more than one distributor 14 may distribute the products of a given manufacturer 12. Each distributor 14 may have one or more distribution units 18. As shown, distributors 14a and 14c each has a single distribution unit 18, whereas distributor 14b has multiple distribution units 18. Each distribution unit 18 may comprise a warehouse facility for temporarily housing products and one or more transport vehicles for delivering the products.

Operators 16 receive the products from one or more distributors 14. In many cases, an operator 16 may receive identical products manufactured by the same manufacturer 12 from multiple distributors 14. Each operator 16 may have one or more operating units 20. As shown, operators 16a and 16c has multiple operating units 20, whereas operator 16b has but a single operating unit 20. Each operating unit 20 can be a location or facility at which meals are prepared and/or served using the products.

Each participant forming part of one or more supply chains may have its own identifier and/or description for identifying a particular product. For example, a manufacturer 12 of a fourteen ounce bottle of ketchup may describe such product as "TOMATO KETCHUP BOTTLE FANCY GRADE." A distributor 14 for the same product may describe it as "TOM CATSUP BOTTLE." An operator 16 receiving the same product may describe it as "KETCHUP BOTTLE PLASTIC FANCY." Furthermore, for distributors 14 and operators 16 having multiple units, each individual distribution unit 18 or operating unit 20 may have its own separate identifier or description for the product. Thus, there may be no uniformity of identifier/description for a product even within the organization of a particular participant.

As products are moved through the supply chains from manufacturers 12 to distributors 14 to operators 16, various data and information are generated by each of the participants (or its units) to document the relevant transactions. This data and information may appear, for example, in purchase orders, invoices, bills of sale, receipts, catalogs, brochures, etc., and may specify products bought or sold, amounts for each product, dates of purchase/sale, dates of delivery, the participants selling products, the participants purchasing products, locations from which products were shipped, locations to which products are delivered, carriers for delivery of products, etc. This data/information constitutes "raw data," and any participant (or smaller unit) generating or outputting the same constitutes a "data source."

The raw data produced by any data source typically incorporates that data source's identifiers or descriptions for the products which are bought or sold. Because the product identifiers/descriptions may differ between data sources, the raw data generated within the supply chains for the food service industry lacks consistency. Accordingly, this raw data may not be very useful to manufacturers 12, distributors 14, or operators 16 which are interested in the total amounts of products bought/sold, amounts of each product purchased from or sold to a particular participant, amount of each product bought/sold off-contract, etc.

In order for participants in the food service industry to optimize efficiency in their operations—for example, in the areas of marketing, distribution, and purchasing—product data standardization system 10, according to an embodiment of the present invention, is provided. Product data standardization system 10 generally functions to receive the raw data generated by the diverse data sources and to generate standardized data for the products which are moved through the supply chains. In the standardized product data, like products are identified by the same identifier or description. Standardized product data is critical for streamlining the supply chains for products in the food service industry. Once the standardized product data has been generated, the participants can access such data from system 10.

To accomplish this, any of manufacturers 12, distributors 14, and operators 16 may interact with product data standardization system 10 via the Internet 22. Internet 22 is an interconnection of computer "clients" and "servers" located throughout the world and exchanging information according to Transmission Control Protocol/Internet Protocol (TCP/IP), Internetwork Packet eXchange/Sequence Packet exchange (IPX/SPX), AppleTalk, or other suitable protocol. Internet 22 supports the distributed application known as the "World Wide Web." Web servers maintain websites, each comprising one or more web pages at which information is made available for viewing. Each website or web page can be identified by a respective uniform resource locator (URL) and may be supported by documents formatted in any suitable language, such as, for example, hypertext markup language (HTML), extended markup language (XML), or standard generalized markup language (SGML). Clients may locally execute a "web browser" or "web proxy" program. A web browser is a computer program that allows exchange information with the World Wide Web. Any of a variety of web browsers are available, such as NETSCAPE NAVIGATOR from Netscape Communications Corp., INTERNET EXPLORER from Microsoft Corporation, and others that allow convenient access and navigation of the Internet 22. Information may be communicated from a web server to a client using a suitable protocol, such as, for example, Hypertext Transfer Protocol (HTTP) or File Transfer Protocol (FTP).

With the standardized product data generated by product data standardization system 10, as described herein, participants in the food service industry can better monitor, manage, control, consolidate, organize, or otherwise analyze the products which they manufacture, distribute, or use in the food service industry.

Operators 16 can monitor purchasing patterns of their operating units 20, for example, to identify or detect off-contract buying. Once detected, measures can be taken to reduce or eliminate off-contract buying activity. This maximizes rebate capture and ensures product consistency from operating unit 20 to operating unit 20. Furthermore, operators 16 can improve the accuracy of their ordering and prevent purchasing errors that result in shortages, or alternatively, excess inventory. Distributors 14 can offer their customers the ability to review purchase histories and check the status of ordering on a corporate-wide basis. Manufacturers 12 can monitor the performance of their distributors 14 with reports that track deliveries, substitutions, shorts, etc., for individual distributors. Also, manufacturers 12 can identify the markets in which various products are most successful, and thus design or target promotions to advance further market penetration. Furthermore, manufacturers 12 can see how well their products sell relative to their competitors' products.

Although the present invention is generally applicable to any environment in which products are moved through various supply chains with each participant having its own identifier or description for the same product, the following description focuses on the food service industry in order to make the inventive concept more concrete. It should be understood, however, that such focus is not intended, nor should be construed, to limit the scope of the present invention.

Product Data Standardization System

Figure 2:
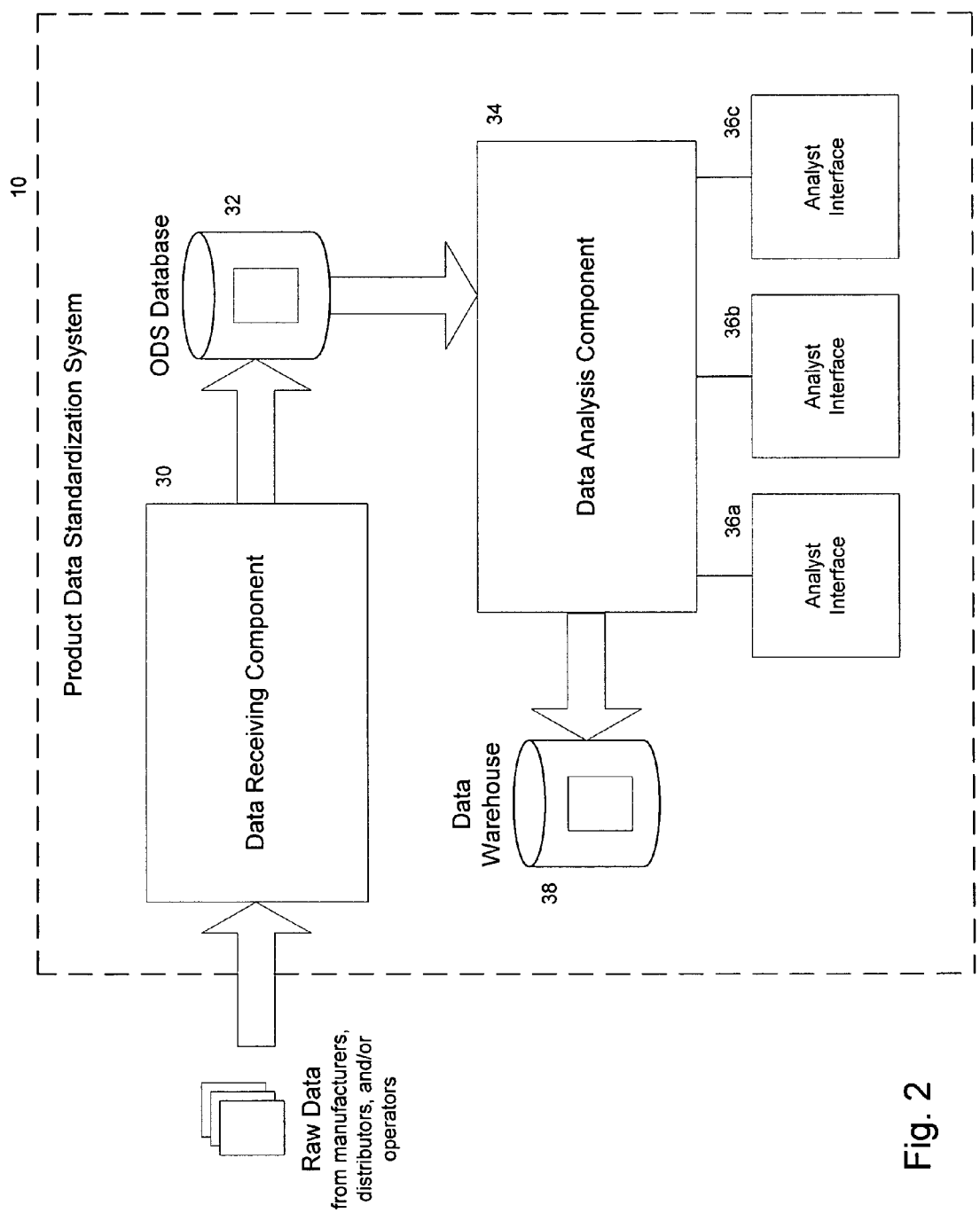
FIG. 2 illustrates a product data standardization system, according to an embodiment of the present invention.

FIG. 2 illustrates a product data standardization system 10, according to an embodiment of the present invention. Product data standardization system 10 functions to generate standardized product data from raw data generated by diverse data sources during the movement of products across various supply chains, for example, in the food service industry. Product data standardization system 10 can be maintained by a participant in the supply chains (e.g., manufacturer 12, distributor 14, or operator 16), or by any entity offering analytical services to one or more participants. As shown, product data standardization system 10 includes a data receiving component 30, an operational data store (ODS) database 32, a data analysis component 34, one or more analyst interfaces 36 (separately labeled 36a, 36b, and 36c), and a data warehouse 38.

Data receiving component 30 receives raw data from one or more data sources. These data sources may include various participants of the food service industry (e.g., manufacturers 12, distributors 14, and operators 16) as well as their smaller units (e.g., distribution units 18 and operating units 20). In one embodiment, the raw data can be packaged at the respective data source in one or more files suitable for transfer, for example, using File Transfer Protocol (FTP) or Hypertext Transfer Protocol (HTTP).

The raw data may include information relating to products offered for sale or purchased by various participants, invoices documenting the sales/purchases, and accounts under which the relevant transactions are made. Product data can specify, for example, product identifiers or descriptions, quantities of sale (e.g., individually or by the case), prices for the products, ordering numbers, catalogs in which products are offered, etc. Invoice data can specify transaction level details including, for example, invoice number, invoice date, participants to the transactions, products which were ordered, quantity for each product, scheduled delivery date, actual delivery date, problems with an order (e.g., defective products), etc. Account data can relate to the organizational structure for one or more participants and may specify, for example, address and contact for main office or headquarters, address and contact for various units (e.g., operating units or distribution units) of each participant, preferred suppliers or purchasers for each participant, etc.

The raw data may comprise values for any number of data fields which are appropriate in the food service industry. These fields may include product name, product number, product identifier, manufacturer name, manufacturer number, manufacturer identifier, brand name, brand identifier, brand code, distributor name, distributor number, pack, pack size, etc. Each such field may have a particular value. For example, a product name field may have one of the following values: "ketchup," "milk," "eggs," "flour," etc. Likewise, a packing size field may have one of the following values: "1 pt," "4 qt," "14 oz," "1 lb," "5 lbs," etc.

Even though the raw data can have details for many products, transactions, and accounts, the files in which the raw data is received may be "flat files" in which there is no separation, division, or delineation as to what any element or piece of data represents. Exemplary raw data in flat file format is illustrated in FIG. 6. The data of the files may be compressed to facilitate transfer from the data sources to product data standardization system 10.

Data receiving component 30 generally functions to receive and process the incoming data files. For each file, data receiving component 30 may process the raw data contained therein so that the data appears in a consistent format suitable for further processing. Data receiving component 30 operates on the raw data, for example, by removing unnecessary formatting and validating the data. Data receiving component 30 may attempt to match a raw description of an unidentified product against the descriptions for various products known to product data standardization system 10. If there is a match, the relevant product has been identified and can be assigned a standardized product code, at least temporarily, until an audit is performed (as further described herein).

The functionality of data receiving component 30 can be performed by any suitable communications hub or router in combination with any one or more suitable processors, such as a main-frame, a file server, a workstation, or other suitable data processing facility supported by memory (either internal or external), running appropriate software, and operating under the control of any suitable operating system (OS), such as MS-DOS, MacINTOSH OS, WINDOWS NT, WINDOWS 95, OS/2, UNIX, LINUX, XENIX, and the like.

ODS database 32 is connected to data receiving component 30. As used herein, the terms "connected," "coupled," or any variant thereof, means any connection or coupling, either direct or indirect, between two or more elements; such connection or coupling can be physical or logical. ODS database 32 generally functions to store the received data after it has been initially processed by data receiving component 30. ODS database 32 may also store standardized identifiers or descriptions for various products which are moved across supply chains and used in the food service industry. The standardized identifiers/descriptions can include standardized product codes for uniquely identifying the products. In an object-oriented implementation for product data standardization system 10, a separate category may be provided for each standardized product code. A set of attributes may characterize each category. For example, attributes for a "cheese" category can be "natural" or "processed." ODS database 32 may also store information for the categories and respective sets of attributes.

In addition, ODS database 32 may store and maintain data and information for a plurality of products and manufacturers which are "known" to product data standardization system 10. This known product and manufacturer data can be used to identify products and manufacturers specified in incoming raw data. For each of a number known products, the information may specify, for example, a raw description for the known product, a universal product code (UPC) for the known product, values for various data fields (e.g., product name, product number, manufacturer name, brand name, pack size, etc.) for the known product, and the like. For each of a number known manufacturers, the information may specify, for example, a raw description for the known manufacturer, values for various data fields (e.g., manufacturer name, manufacturer number, brand names, brand numbers, etc.) for the known manufacturer, and the like. This information can be received from the data sources, or alternatively, may be developed within product data standardization system 10 over time, for example, by a learning algorithm.

ODS database 32 be implemented with any one or more suitable storage media, such as random access memory (RAM), read-only memory (ROM), disk drives, tape storage, or other suitable volatile and/or non-volatile data storage facility. ODS database 32 may be configured as a relational database.

Data analysis component 34 generally functions to further process the data received from the diverse data sources. Among other things, data analysis component 34 may parse or separate the received data into the distinct field values. Data analysis component 34 may also attempt to identify a product specified in the raw data by comparing the field values for the product against one or more predefined combinations of field values of known products. Data analysis component 34 may also generate one or more educated guesses as to the identity of a product. These guesses can be used in assigning a standardized product code to the product. Data analysis component 34 also provides for the creation of new standardized product codes for any new products. Data analysis component 34 may provide for auditing of each assignment or creation of a standardized product code.

The functionality of data analysis component 34 can be performed by any one or more suitable processors, such as a main-frame, a file server, a workstation, or other suitable data processing facility supported by memory (either internal or external), running appropriate software, and operating under the control of any suitable operating system (OS), such as MS-DOS, MacINTOSH OS, WINDOWS NT, WINDOWS 95, OS/2, UNIX, LINUX, XENIX, and the like. Such processors can be the same or separate from the processor performing the functionality for data receiving component 30.

Analyst interfaces 36 are in communication with data analysis component 34 and generally function to enable human analysts to interact with the same, for example, to review raw (or initially processed) data and guesses, and assist in the assignment and audit of standardized product codes. The functionality of each analyst interface 36 can be performed by one or more suitable input devices, such as a key pad, touch screen, input port, pointing device (e.g., mouse), microphone, and/or other device that can accept information, and one or more suitable output devices, such as a computer display, output port, speaker, or other device, for conveying information, including digital data, visual information, or audio information. In one embodiment, each analyst interface 36 may comprise or be operable to display at least one graphical user interface (GUI) having a number of interactive devices, such as buttons, windows, pull-down menus, and the like to facilitate the entry, viewing, and/or retrieval of information.

Data warehouse 38, which is connected to data analysis component 34, generally functions to store and maintain the standardized product data output by data analysis component 34. Data warehouse 38 can be implemented with any one or more suitable storage media, such as random access memory (RAM), read-only memory (ROM), disk drives, tape storage, or other suitable volatile and/or non-volatile data storage facility. This data storage facility may be the same as or separate from the data storage facility implementing ODS database 32.

From data warehouse 38, the standardized product data can be made available to various participants in the food service industry. Manufacturers 12, distributors 14, and operators 16 may then access the standardized product data, for example, via a website maintained by the entity operating product data standardization system 10, and use the same for their own analyses of market trends, purchasing patterns, etc.

Data Receiving Component

Figure 3:
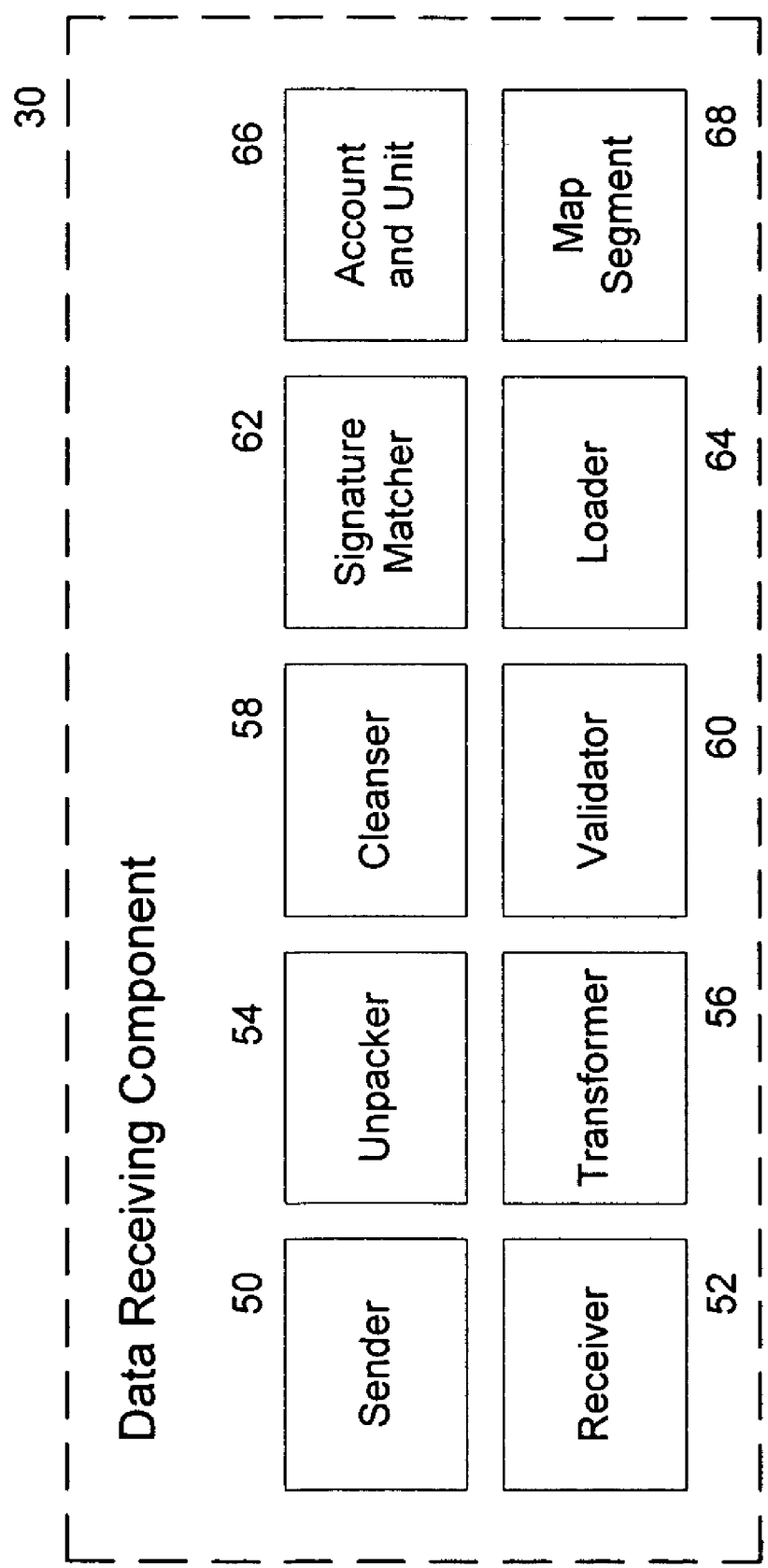
FIG. 3 is a block diagram for a data receiving component, according to an embodiment of the present invention.

FIG. 3 is a block diagram for a data receiving component 30, according to an embodiment of the present invention. As depicted, data receiving component 30 includes a sender module 50, a receiver module 52, an unpacker module 54, a transformer module 56, a cleanser module 58, a validator module 60, a signature matcher module 62, a loader module 64, an account and unit module 66, and a map segment module 68. Each of these modules 50 through 68 may comprise one or more programs which, when executed, perform the functionality described herein.

Sender module 50 and receiver module 52 cooperate to support the transfer of data and information to and from product data standardization system 10. These modules may implement or support various protocols, such as, for example, File Transfer Protocol (FTP) or Hypertext Transfer Protocol (HTTP). The data/information may include raw data generated by various data sources and can be in the form of one or more files. Each such file of raw data may be compressed to facilitate transfer.

Unpacker module 54 decompresses or "unpacks" the files of raw data which are received at sender/receiver modules. Transformer module 56 transforms the raw data, for example, by applying various meta-data rules to make field breaks in the data. This places the received data in a consistent format for further processing. Cleanser module 58 "cleanses" the transformed data, for example, by removing extraneous formatting codes added during transfer or compression. Validator module 60 validates the cleansed data to ensure that the items intended to be represented are valid. Thus, cleanser module 58 assures the quality of each field in the product data, while validator module 60 assures the quality of each product.

Signature matcher module 62 attempts a "signature match" for each product specified in the received data. Typically, in the raw data, each product is described with a raw description having textual information for the product, its manufacturer, package size, etc. This raw description may constitute a "signature" for the product.

There may be different kinds of signatures, such as, for example, distribution center (DC) signatures, DC product signatures, account signatures, and transaction signatures. Each kind of signature may comprise various fields. A DC signature may have a field for a DC number code (dc_num). A DC product may have fields for DC product number (dc_prod_num), DC product name (dc_prod_name), DC pact quantity (dc_pact_qty), DC package size (dc_pack_size), DC brand (dc_brand), DC vendor number (dc_vendor_num), DC vendor name (dc_vendor_name), DC sell by unit of measure (dc_sb_uom), and DC price by unit of measure (dc_pb_uom). An account signature may have fields for DC number code (dc_num) and account number code (account_num). A transaction signature may have a field for an identifier of a DC signature (dc_sig_id) and an identifier of a DC product signature (dc_prod sig_id). For each signature, product data standardization system 10 may assign a numeric identifier (dc_sig_id, dc_prod_sig_id, acct_sig_id, trx_sig_id).

Thus, in one embodiment for the signature matching process, signature matcher module 62 receives a raw description for a product and, in response, outputs numeric identifiers (e.g., dc_sig_id, dc_prod_sig_id, acct_sig_id, trx_sig_id) for the different kinds of signatures (e.g., DC signature, DC product signature, account signature, and transaction signature) contained therein.

Two exemplary signatures are shown in the following table.

| Field name | Example one | Example two |
|---|---|---|
| KTS ID | 500562000 | 500644053 |
| DC product number | 0185736 | 9817611 |
| DC product name | Raisins seedless dark select | Oil, peanut |
| DC pack quantity | 024 | 00001 |
| DC pack size | 15 OZ | 35 LB |
| DC brand | PACKER | BUNGE EDIBLE OIL |
| DC vendor number | (blank) | 7695/10421 |
| DC vendor name | (blank) | BUNGE EDIBLE OIL |
| DC UPC | (blank) | (blank) |
| DC SELL BY UOM | CS | CS |
| DC Price By UOM | (blank) | LB |
| DC Name | US FOODSERVICE-ATLANTA | SHAMROCK FOODS |

Product data standardization system 10 may store information for product signatures that it has previously seen in other raw data or received from a participant in some other way. Signature matcher module 62 compares the signature for each product specified in the raw data against the stored signatures for known products. If there is an exact match for a received product signature, signature matcher module 62 will assign an appropriate standardized product code for the product under consideration. At a later point, the assigned standardized product code may be audited for accuracy. If there is not an exact match for a received product signature, no standardized product code is assigned to the product at the current time.

Loader module 64 generally functions to load the received data into ODS database 32. Account and unit module 66 generally functions to support the establishment or updating of one or more accounts. These accounts are provided for participants which would like to have access to the standardized product data generated by product data standardization system 10. Each account for a participant may be divided into sub-accounts for the units (e.g., operating units or distribution units) of that participant. Map segment module 68 generally functions to support the entry or updating of information relating to the organizational structure of various participants. This information, for example, may "map" or outline the various operating units 20 of a operator 16 or the various distribution units 18 of a distributor 14.

Data Analysis Component

Figure 4:
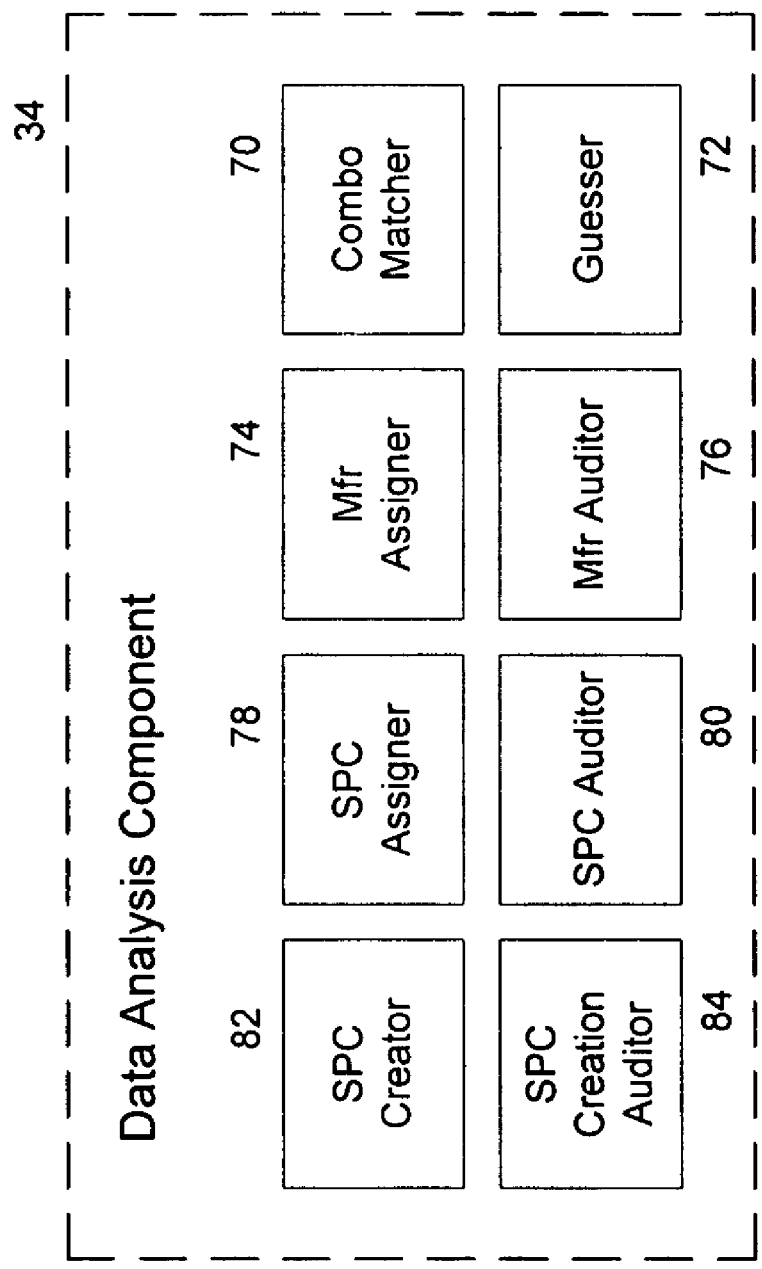
FIG. 4 is a block diagram for a data analysis component, according to an embodiment of the present invention.

FIG. 4 is a block diagram for a data analysis component 34, according to an embodiment of the present invention. As depicted, data analysis component 34 includes a combination matcher module 70, a guesser module 72, a manufacturer assigner module 74, a manufacturer auditor module 76, a standardized product code (SPC) assigner module 78, a SPC auditor module 80, a SPC creator module 82, and a SPC creation auditor module 84. Each of these modules 70 through 84 may comprise one or more programs which, when executed, perform the functionality described herein.

Combination matcher module 70 generally functions to match various fields of the received data for an unidentified product against one or more predetermined combinations of fields. This is done to identify the particular product or a manufacturer of the same. Specifically, a given product or manufacturer may be uniquely identified by the values it is assigned for certain fields.

If all field values for an unidentified product specified in the received data match a particular combination of field values, a standardized product code can be assigned to the product. For a product, the following combinations of fields may be used for matching:

(1) Distributor_id, product_no, product_name, brand_code, pack, pack_size;
(2) Distributor_id, mfc_product_no, product_name, brand_code, pack, pack_size; and
(3) Product_view_id, product_no, product_name, brand_code, sell_by_uom.

Likewise, the manufacturer for a product specified in the received data can be identified if all field values for the product match a particular combination of field values. For a manufacturer, the following combinations of fields may be used for matching:

(1) Brand_code, product_view_id, raw_mfc_name;
(2) Brand_code, raw_mfc_name, distributor_id;
(3) Brand_code, raw_mfc_name;
(4) Brand_code, product_view_id; and
(5) Brand_code, distributor_id.

Guesser module 72 generally functions to generate one or more guesses as to the identity of a product specified in the received data. Guesser module 72 may output one or more standardized product descriptions and/or codes for each product it considers. For each standardized product description or code, guesser module 72 may also output a respective confidence measure as to a match between the product under consideration and the standardized description/code. The confidence measure can be a normalized value (i.e., between zero and one) that is monotonically related to similarity. In one embodiment, the confidence measure can be a percentage value (e.g., 100%, 85%, 20%, etc.) which represents a measure of confidence as to the certainty of the match. The description/codes and respective confidence measures generated by guesser module 72 can be used in assigning a standardized product code to each product, and then auditing the assignment. In one embodiment, the description/codes and confidence measures can be presented to one or more analysts for consideration and review.

Guesser module 72 may perform a pattern match to determine the similarity of a product specified in the raw data against one or more known products. Raw data with sufficiently high similarity with a known product may be automatically assigned a standardized product code, thereby eliminating the need for manual intervention. In one embodiment, the fields considered by guesser module 72 in performing the pattern match include manufacturer, product_description, brand_code, sell_by_uom, pack, pack_size, and pricing_uom. Guesser module 72 finds a predetermined number (e.g., twenty-five) of the most similar products, and gives the respective standardized product codes as guesses. Furthermore, guesser module 72 may identify new signatures or raw descriptions which can be mapped to respective standardized product codes for use in the future by signature matcher module 62 of data receiving component 30.

Manufacturer assigner module 74 generally functions to assign an appropriate standardized manufacturer code to various products specified in the received data. To accomplish this, manufacturer assigner module 74 may use the information (e.g., a list of possible manufacturers) generated by guesser module 72. In one embodiment, for each unidentified product being considered, manufacturer assigner module 74 presents information, such as the list of possible manufacturers, to an analyst for assistance in making an assignment. Manufacturer auditor module 76 generally functions to audit each assignment of a manufacturer code. In one embodiment, manufacturer auditor module 76 presents information, which may include the assigned manufacturer code, to an analyst for assistance in the audit. This analyst can be the same as or different from the analyst assisting with the assignment. An exemplary screen display for manufacturer assignment and audit, according to an embodiment of the present invention, is illustrated in FIG. 7.

Figure 8:
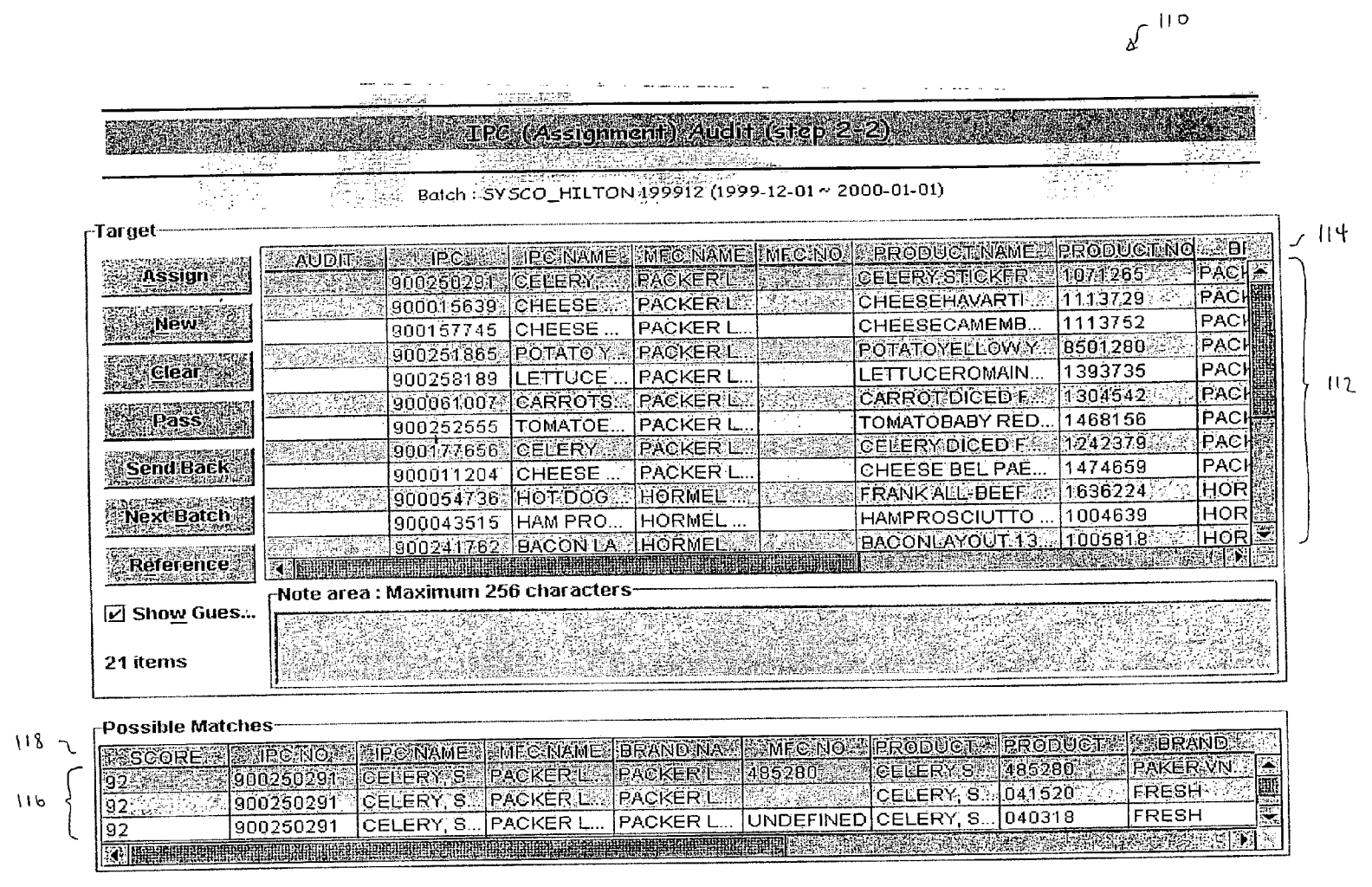

SPC assigner module 78 generally functions to assign a standardized product code to various products specified in the received data. To accomplish this, SPC assigner module 78 may use the information (e.g., one or more guesses of possible standardized product codes) generated by guesser module 72. In one embodiment, for each product being considered, SPC assigner module 78 presents information, such as the list of guesses of possible standardized product codes, to an analyst for assistance in making the assignment. SPC auditor module 80 generally functions to audit each assignment of a standardized product code. In one embodiment, SPC auditor module 80 presents information, which may include the assigned standardized product code, to an analyst for assistance in the audit. The auditing analyst can be the same as or different from the analyst assisting in making the assignment. An exemplary screen display for standardized product code assignment and audit, according to an embodiment of the present invention, is illustrated in FIG. 8.

Figure 9:
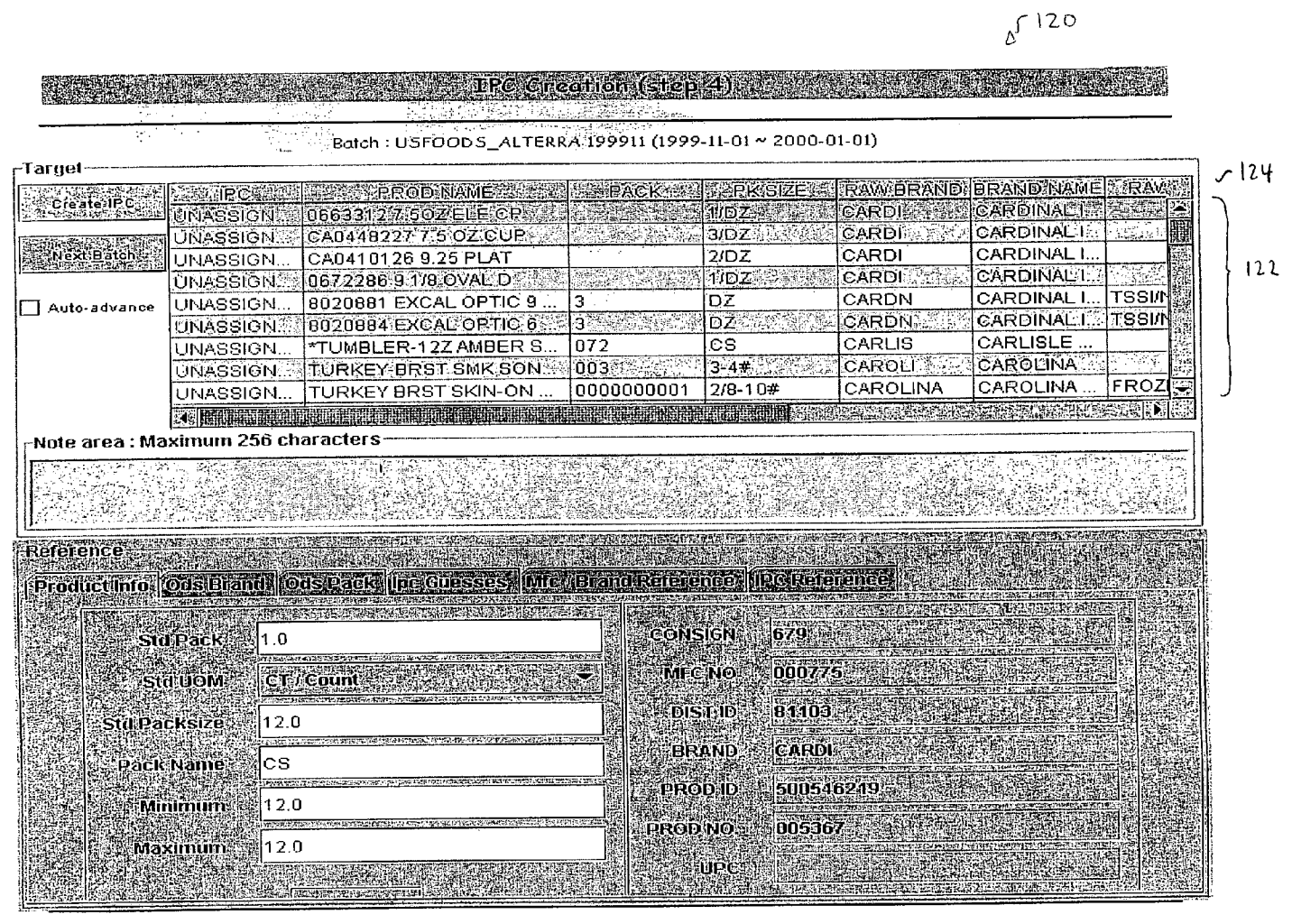

SPC creator module 82 generally functions to create a new standardized product code, for example, in the event that no existing standardized product code is appropriate for a product specified in the received data. In one embodiment, for each standardized product code being created, SPC creator module 82 presents information, such as a suggested standardized product code, to an analyst for assistance in creating a new code. SPC creation auditor module 84 generally functions to audit each creation of a new standardized product code. In one embodiment, SPC creation auditor module 84 presents information, which may include the newly created standardized product code, to an analyst for assisting in the audit. This analyst can be the same as or different from the analyst assisting in the creation of the new code. An exemplary screen display for standardized product code creation, according to an embodiment of the present invention, is illustrated in FIG. 9.

Hardware Implementation

Figure 5:
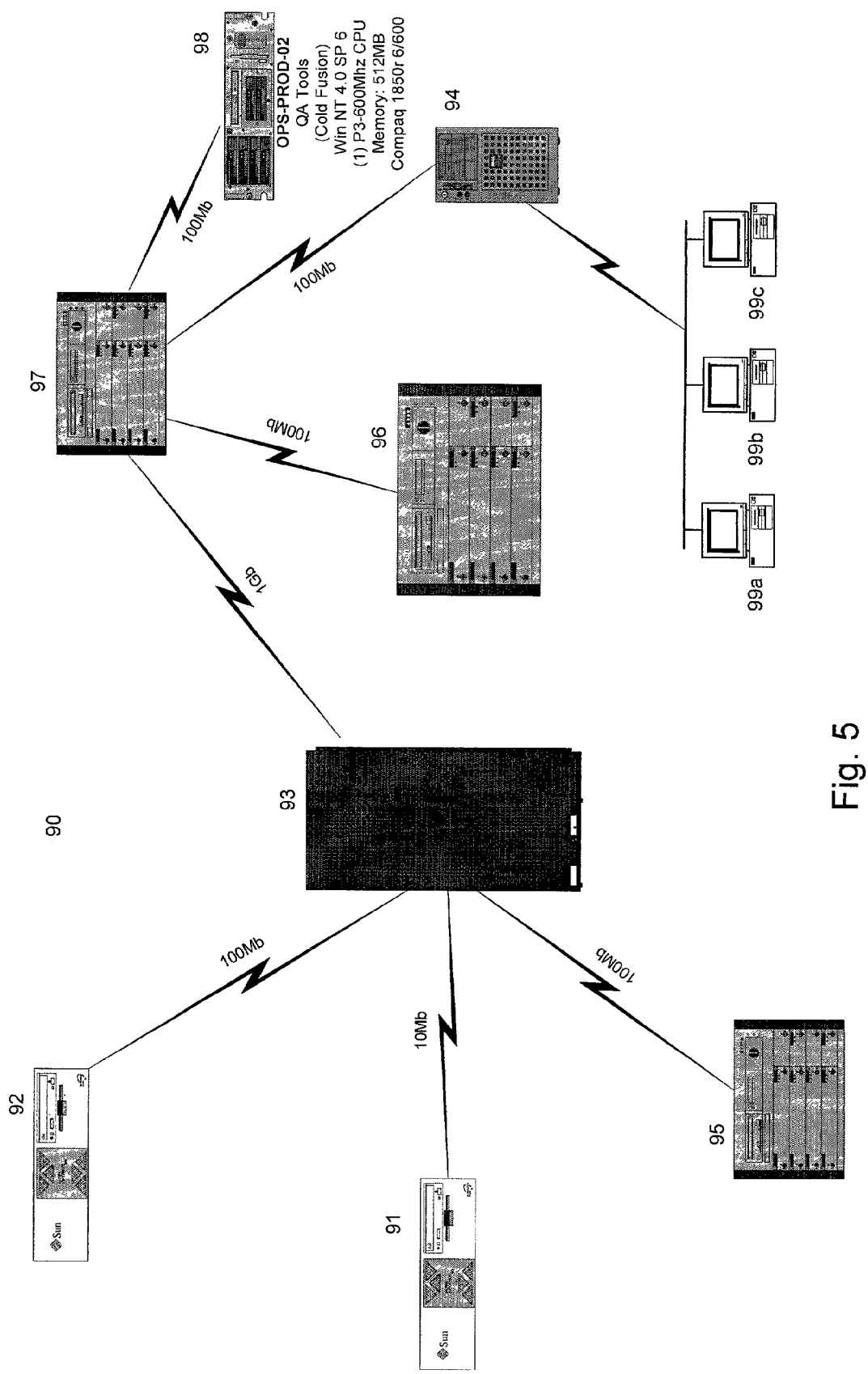
FIG. 5 illustrates an exemplary computer-based for implementing the product data standardization system.

FIG. 5 illustrates a computer-based system 90 that is an exemplary hardware implementation for product data standardization system 10. In general, computer-based system 90 may include, among other things, a number of processing facilities, storage facilities, data servers, and workstations.

As depicted, the processing facilities may include process servers 91 and 95, file servers 93 and 96, a data server 97 and workgroup servers 94 and 98. In one embodiment, process servers 91 and 95 can be implemented with servers commercially available from Sun Microsystems. File servers 93 and 96 can be implemented with any suitable storage solution, such as, for example, those commercially available from EMC, Auspex Systems, or Network Appliance. Workgroup servers 94 and 98 can be implemented with servers commercially from Dell Computer Corporation or Compaq Computers. Each of process servers 91 and 95, file servers 93 and 96, and workgroup servers 94 and 98 can run any suitable operating system, such as, for example, SUN SOLARIS 5.6 from Sun Microsystems or WINDOWS NT from Microsoft Corporation.

Process servers 91 and 95, file servers 93 and 96, and data server 97 may provide the primary processing capability required to implement the functionality of data receiving component 30 of product data standardization system 10. This includes the functionality of sender module 50, receiver module 52, unpacker module 54, transformer module 56, cleanser module 58, validator module 60, signature matcher module 62, loader module 64, account and unit module 66, and map segment module 68. In one embodiment, each of modules 50 through 68 can be implemented, at least in part, as one or more programs running on process servers 91 and 95, file servers 93 and 96, and data server 97, with each module being initiated when its functionality is required, as described herein.

Workgroup server 94 and process server 95 may provide the primary processing capability required to implement the functionality of data analysis component 34 of product data standardization system 10. This includes the functionality of combination matcher module 70, guesser module 72, manufacturer assigner module 74, manufacturer auditor module 76, SPC assigner module 78, SPC auditor module 80, SPC creator module 82, and SPC creation auditor module 84. In one embodiment, each of modules 70 through 84 can be implemented, at least in part, as one or more programs running on workgroup server 94 and process server 95, with each module being initiated when its functionality is required, as described herein.

The storage facilities of computer-based system 90 may include data server 97 and file servers 93 and 96. In one embodiment, data server 97 can be implemented with SUN Server Class equipment commercially available from Sun Microsystems. Data server 97 can run a SOLARIS operating system. Furthermore, data server 97 can run any suitable database application, such as an ORACLE database. Data servers comprise or support associated memories, which can include any one or a combination of suitable storage media, such as random access memory (RAM), read-only memory (ROM), disk, tape storage, or other suitable volatile and/or non-volatile data storage media.

Data server 97 and file servers 93 and 96 may provide the primary storage capability required to implement the functionality of ODS database 32 and data warehouse 38 of product data standardization system 10. The associated memories of data server 97 and file servers 93 and 96 receive, store, and forward the various data and information input into and generated within product data standardization system 10. Thus, for example, the associated memories may store raw data, standardized identifiers/descriptions, known product data, and standardized product data.

A plurality of workstations 99 (separately labeled 99*a*, 99*b*, and 99*c*) are connected to workgroup server 94. Each workstation 99 can be a computer having one or more suitable input devices (e.g., a keypad, touch screen, mouse, etc.) and output devices (e.g. a video monitor, audio speaker, etc.) for communicating data/information associated with the operation of product data standardization system 10, including digital data, visual information, or audio information. Each workstation 99 may include fixed or removable storage media, such as magnetic computer disc, optical disc, CD-ROM, or other suitable media to both receive output from and provide input to product data standardization system 10. Workstations 99 may provide the primary interface capability required to implement the functionality of analyst interfaces 36 of product data standardization system 10.

Screen Display for Manufacturer Assignment and Audit

FIG. 7 illustrates an exemplary screen display 100 for manufacturer assignment and audit, according to an embodiment of the present invention. Screen display 100 may be generated by one or both of manufacturer assigner and auditor modules 74 and 76 of data analysis component 34.

In screen display 100, one or more entries 102 may be presented to an analyst in order to identify and audit respective manufacturers under consideration. Each entry 102 may comprise values in various fields 104. As shown, these fields 104 include manufacturer (MFC), raw manufacturer name (RAW MFC NAME), brand (BRAND), product identifier (PRODUCT ID), product name (PRODUCT NAME), distributor (DISTRI), pack (PACK), and pack size (PACK SIZE).

A number of possible matches 106 are also presented to the analyst. These matches 106 can be generated by guesser module 72 of data analysis component 34. Each possible match 106 may comprise values in various fields 108. As shown, these fields 108 include manufacturer identifier (MFC ID), brand (BRAND), brand identifier (BRAND ID), brand name (BRAND NAME), distribution center identifier (DC ID), distributor (DIST), manufacturer name (MFC NAME), etc.

Screen Display for SPC Assignment and Audit

FIG. 8 illustrates an exemplary screen display 110 for standardized product code assignment and audit, according to an embodiment of the present invention. Screen display 110 may be generated by one or both of SPC assigner and auditor modules 78 and 80 of data analysis component 34.

In screen display 110, one or more entries 112 may be presented to an analyst in order to identify and audit respective products under consideration. Each entry 112 may comprise values in various fields 114. As shown, these fields 114 include standardized product code (SPC or IPC), standardized product code name (IPC NAME), manufacturer name (MFC NAME), manufacturer number (MFC NO), product name (PRODUCT NAME), product number (PRODUCT NO), etc.

A number of possible matches 116 are also presented to the analyst. These matches 116 can be generated by guesser module 72 of data analysis component 34. Each possible match 116 may comprise values in various fields 118. As shown, these fields 118 include standardized product code number (IPC NO), standardized product code name (IPC NAME), manufacturer name (MFC NAME), brand name (BRAND NAME), manufacturer number (MFC NO), product name (PRODUCT NAME), product number (PRODUCT NO), etc. Also provided are a number of scores which can reflect the measure of confidence that a particular possible match 116 is a match for a product under consideration.

Screen Display for SPC Creation

FIG. 9 illustrates an exemplary screen display 120 for standardized product code creation, according to an embodiment of the present invention. Screen display 120 may be generated by one or both of SPC creator and creation auditor modules 82 and 84 of data analysis component 34.

In screen display 120, one or more entries 122 may be presented to an analyst in order to create and audit the creation of respective new standardized product codes. Each entry 122 may comprise values in various fields 124. As shown, these fields 124 include product name (PRODUCT NAME), pack (PACK), and pack size (PK SIZE), raw brand description (RAW BRAND), brand name (BRAND NAME), etc.

Method for Standardizing Product Data

Figure 10:
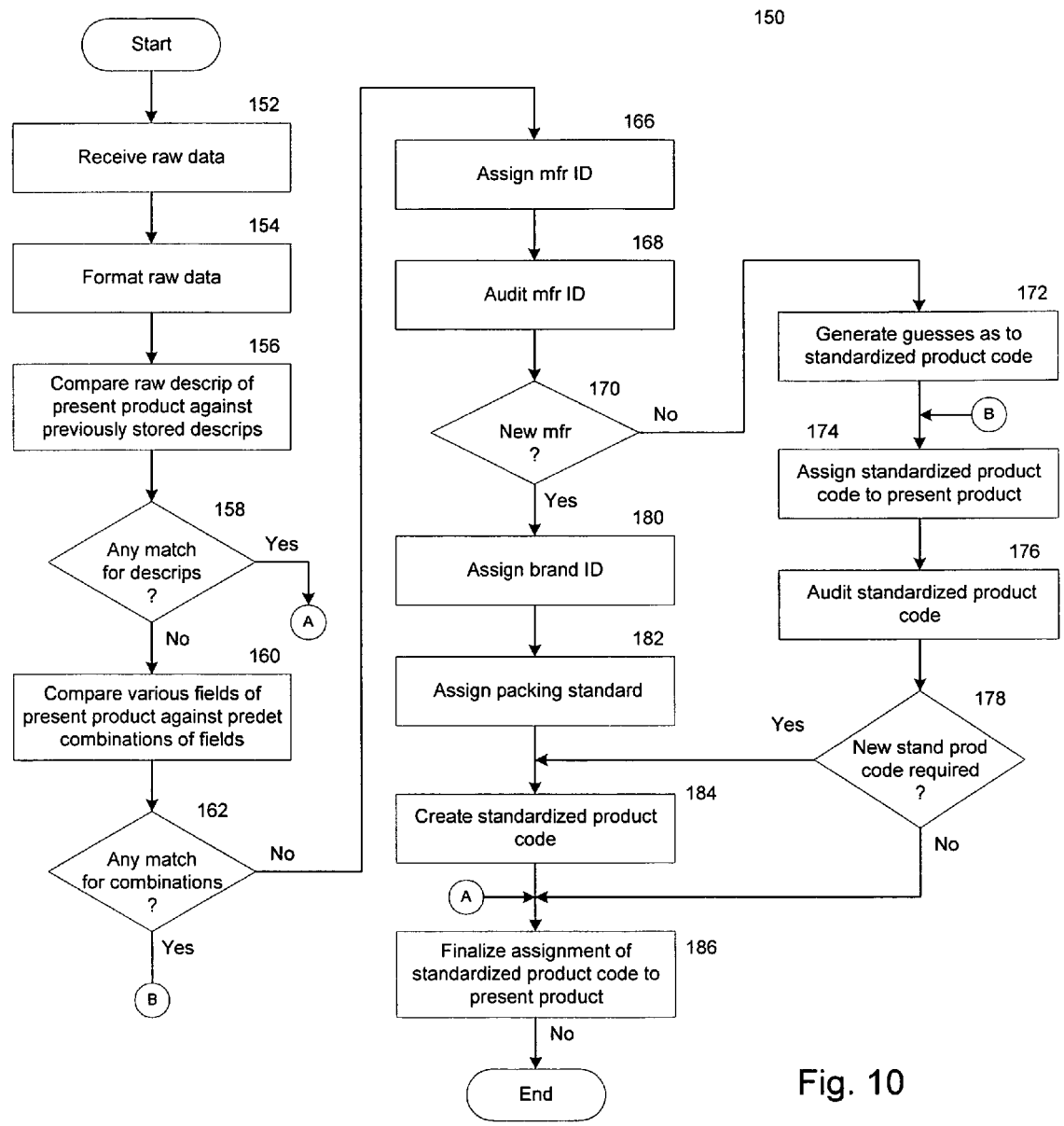
FIG. 10 is a flow diagram of an exemplary method for standardizing product data, according to an embodiment of the present invention.

FIG. 10 is a flow diagram of an exemplary method 150 for standardizing product data, according to an embodiment of the present invention. Method 150, which may correspond to the operation of product data standardization system 10, can be performed for each product specified in raw data received from one of a number of diverse data sources.

Method 150 begins at step 152 where product data standardization system 10 receives the raw data for a product at data receiving component 30. At step 154, data receiving component 30 formats the raw data into a form that is suitable for further processing. This may include unpacking, transforming, cleansing, and validating the raw data, as performed by unpacker module 54, transformer module 56, cleanser module 60, and validator module 62, respectively. The received data may include information relating to a number of products moving through one or more supply chains.

At step 156, signature matcher module 62 compares a raw description or "signature" for the product against various signatures previously seen by system 10. At step 158, signature matcher module 62 determines whether there is any match for the signature of the product under consideration. If there is a match, method 150 moves to step 186 (as described below). Alternatively, if there is no match for the signature, the data for the product is forwarded (via ODS database 32) to data analysis component 34.

At step 160, combination matcher module 70 compares various fields for the product against predetermined combinations of fields in another attempt to match the product. At step 162, combination matcher module 70 determines whether the field value for the product under consideration match any of the predetermined combinations. If there is a match, then method 150 moves to step 174 where data analysis component 34 assigns the standardized product code for that combination to the product, after which the assigned standardized product code is audited at step 176 (as described below). Otherwise, if it is determined at step 162 that there is no match, then at step 166 manufacturer assigner module 74 assigns a manufacturer to the product. In one embodiment, manufacturer assigner module 74 may display at least a portion of the received data to an analyst for assistance in making the assignment. After a manufacturer has been assigned, manufacturer auditor module 76 audits the assignment at step 168. In one embodiment, manufacturer auditor module 76 may display the assigned manufacturer to the same or a different analyst for assistance in the audit. This serves as a check on the manufacturer assignment.

At step 170, data analysis component 34 determines whether the manufacturer assigned to the product is new to system 10. If the manufacturer is new, then method 150 moves to step 180 (as described below). Alternatively, if the manufacturer is not new, then at step 172 guesser module 72 generates one or more guesses as to the identity of the product. To accomplish this, guesser module 72 may consider the product line of the assigned manufacturer. In one embodiment, guesser module 72 may output up to a predetermined number (e.g., twenty) of guesses for the product. Along with each guess, guesser module 72 may also generate a confidence measure (expressed as a percentage value) as to the level of confidence that the guess is correct. A more detailed description of the operation of guesser module 72 is provided below.

At step 174, SPC assigner module 78 assigns a standardized product code to the product, for example, using the guesses and respective confidence measures generated by guesser module 72. In one embodiment, SPC assigner module 78 may display the guesses and respective confidence measures to an analyst for assistance in making the assignment of a standardized product code. After a standardized product code has been assigned, SPC auditor module 80 audits the assignment at step 176. In one embodiment, SPC auditor module 80 may display the assigned standardized product code to the same or a different analyst for assisting in the audit. This serves as a check on the manufacturer assignment.

At step 178, data analysis component 34 determines whether a new standardized product code is required. If a new standardized product code is not required, method 150 moves to step 186 where the assignment of a standardized product code for the product under consideration is finalized, after which method 150 ends. Otherwise, if a new standardized product code is required, then method 150 moves to step 184 (as described below).

Returning again to step 170, if the manufacturer assigned to the product is new to the system, then a new standardized product code should be created. At steps 180 and 182, SPC creator module 82, using various information for the product under consideration, assigns a brand identifier and packing standard for the new standardized product code. In one embodiment, SPC creator module 82 may display various information for the product under consideration to an analyst for assistance in making the assignment of a brand identifier and packing standard. After a new standardized product code has been created, then at step 184 SPC creation auditor module 84 audits the newly created standardized product code. In one embodiment, SPC creation auditor module 84 displays the newly created standardized product code to the same or a different analyst for assistance in the auditing. This serves as a check on the creation of a new standardized product code. At step 186, the assignment of a standardized product code for the product under consideration is finalized, after which method 150 ends.

Method for Signature Match

Figure 11:
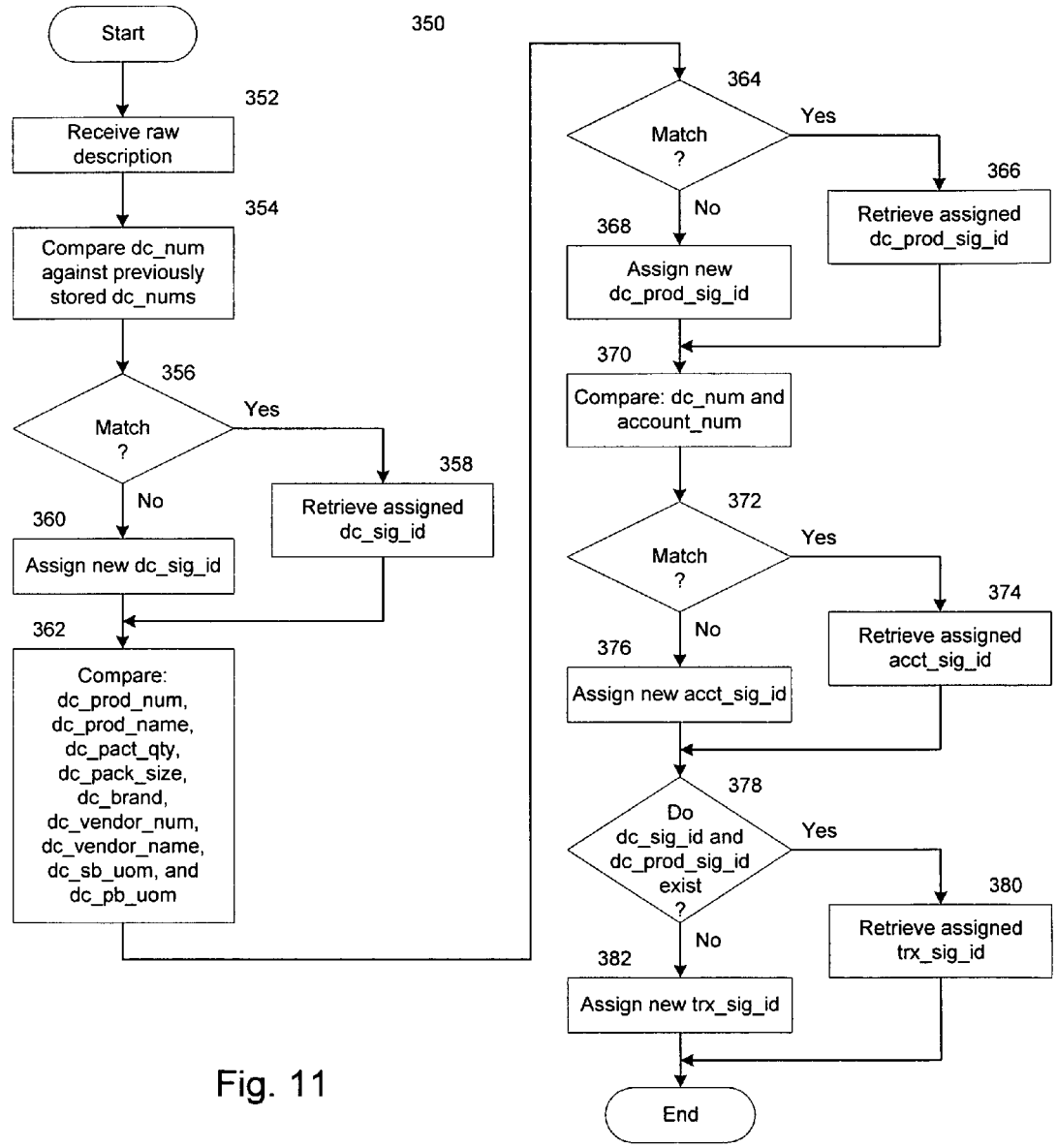
FIG. 11 is a flow diagram of an exemplary method for performing a signature match, according to an embodiment of the present invention.

FIG. 11 is a flow diagram of an exemplary method 350 for performing a signature match, according to an embodiment of the present invention. In one embodiment, method 350 may correspond to the operation for signature matcher module 62 of data receiving component 30 and can be performed for an unidentified raw description.

Method 350 begins at step 352 where signature matcher module 62 receives a raw description for a product. This raw description may include a number of different fields for various signatures, such as, a distribution center (DC) signature, a DC product signature, an account signature, and a transaction signature. These fields include a DC number code (dc_num), DC product number (dc_prod_num), DC product name (dc_prod_name), DC pact quantity (dc_pact_qty), DC package size (dc_pack_size), DC brand (dc_brand), DC vendor number (dc_vendor_num), DC vendor name (dc_vendor_name), DC sell by unit of measure (dc_sb_uom), and DC price by unit of measure (dc_p-b_uom), account number code (account_num).

At step 354, signature matcher module 62 compares a DC number code from the raw description against DC number codes previously stored in product data standardization system 10. At step 356, signature matcher module 62 determines whether any of the stored DC number codes match the DC number code under consideration. If there is a match, then at step 358 signature matcher module 62 retrieves an associated DC signature identifier (dc_sig_id) which is assigned to the stored DC number code; this retrieved DC signature identifier is then used as the DC signature identifier for the DC number code under consideration. Otherwise, if there is no match, then at step 360 signature matcher module 62 assigns a new DC signature identifier to the DC number code under consideration.

At step 362, signature matcher module 62 compares a DC product number, a DC product name, a DC pact quantity, a DC package size, a DC brand, a DC vendor number, a DC vendor name, a DC sell by unit of measure, and a DC price by unit of measure for a DC product signature in the raw description against like fields previously stored in product data standardization system 10. At step 364, signature matcher module 62 determines whether there is a match of the previously stored fields and the fields for the DC product signature under consideration. If there is a match, then at step 366 signature matcher module 62 retrieves an associated DC product signature identifier (dc_prod_sig_id) which is assigned to the stored fields; this retrieved DC product signature identifier is then used as the DC product signature identifier for the DC product signature under consideration. Otherwise, if there is no match, then at step 368 signature matcher module 62 assigns a new DC product signature identifier to the DC product signature under consideration.

At step 370, signature matcher module 62 compares a DC number code and an account number code for an account signature in the raw description against like fields previously stored in product data standardization system 10. At step 372, signature matcher module 62 determines whether there is a match of the previously stored fields and the fields for the account signature under consideration. If there is a match, then at step 374 signature matcher module 62 retrieves an associated account signature identifier (acct_sig_id) which is assigned to the stored fields; this retrieved account signature identifier is then used as the account signature identifier for the account signature under consideration. Otherwise, if there is no match, then at step 376 signature matcher module 62 assigns a new account signature identifier to the account signature under consideration.

At step 378, signature matcher module 62 determines whether the DC signature identifier and DC product signature identifier assigned for the present raw description already exist within product data standardization system 10. If these already exist, then at step 380 signature matcher module 62 retrieves an associated transaction signature identifier (trx_sig_id) which is assigned for DC signature identifier and DC product signature identifier. Otherwise, if the DC signature identifier and DC product signature do not already exist, then at step 382 signature matcher module 62 assigns a new transaction signature identifier to then raw description under consideration.

Afterwards, method 350 ends.

Method for Combination Matching for a Product

Figure 12:
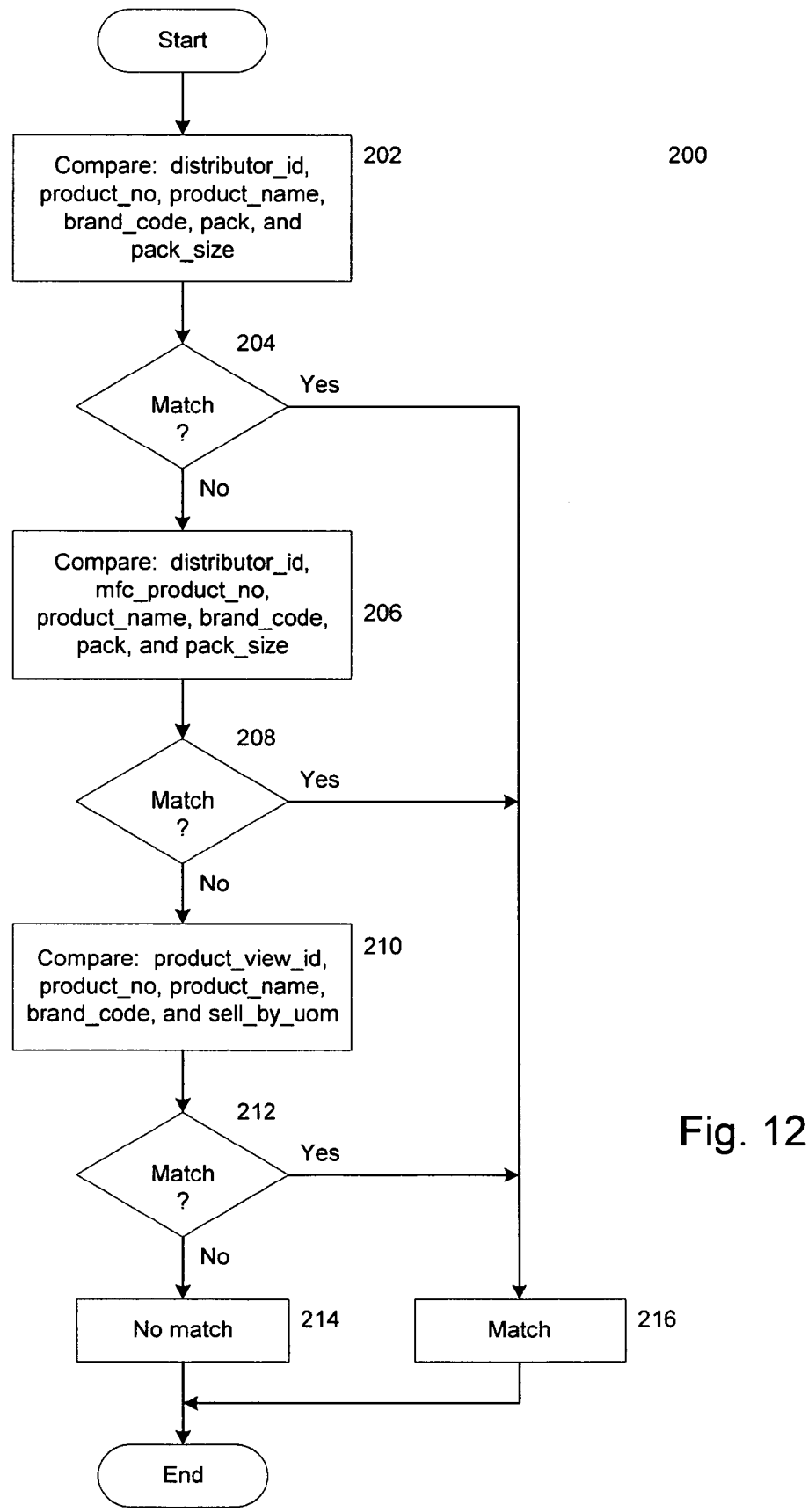
FIG. 12 is a flow diagram of an exemplary method for matching a combination of fields for a product, according to an embodiment of the present invention.

FIG. 12 is a flow diagram of an exemplary method 200 for matching a combination of fields for a product, according to an embodiment of the present invention. In one embodiment, method 200 may correspond to one aspect of operation for combination matcher module 70 of data analysis component 34 and can be performed for an unidentified product specified in raw data.

Method 200 begins at step 202 where combination matcher module 70 compares values in various fields for the product under consideration against multiple sets of values for the following combination of fields: distributor identifier, product number, product name, brand code, pack, and pack size. At step 204, for all of these fields, combination matcher module 70 determines whether the values of any set exactly match the values of the product under consideration. If so, then method 200 moves to step 216 where combination matcher module 70 generates an indicator that there is a "match" for the product under consideration, after which method 200 ends.

Alternatively, if at step 204 it is determined that none of the sets exactly match the product under consideration in that particular combination of fields, then at step 206 combination matcher module 70 compares values for the product under consideration against multiple sets of values for the following combination of fields: distributor identifier, manufacturer product number, product name, brand code, pack, and pack size. At step 208, for all of these fields, combination matcher module 70 determines whether the values of any set exactly match the values of the product under consideration. If so, then method 200 moves to step 216 where combination matcher module 70 generates an indicator that there is a "match" for the product under consideration, after which method 200 ends.

Otherwise, if at step 208 it is determined that none of the sets exactly match the product under consideration in that particular combination of fields, then at step 210 combination matcher module 70 compares values for the product under consideration against multiple sets of values for the following combination of fields: product view identifier, product number, product name, brand code, and sell by unit of measure (UOM). At step 212, for all of these fields, combination matcher module 70 determines whether the values of any set exactly match the values of the product under consideration. If so, then method 200 moves to step 216 where combination matcher module 70 generates an indicator that there is a "match" for the product under consideration, after which method 200 ends.

Alternatively, if at step 212 it is determined that none of the sets exactly match the product under consideration in that particular combination of fields, then at step 214 combination matcher module 70 generates an indicator that there is a "no match" for the product under consideration. Method 200 ends.

Method for Combination Matching for a Manufacturer

Figure 13:
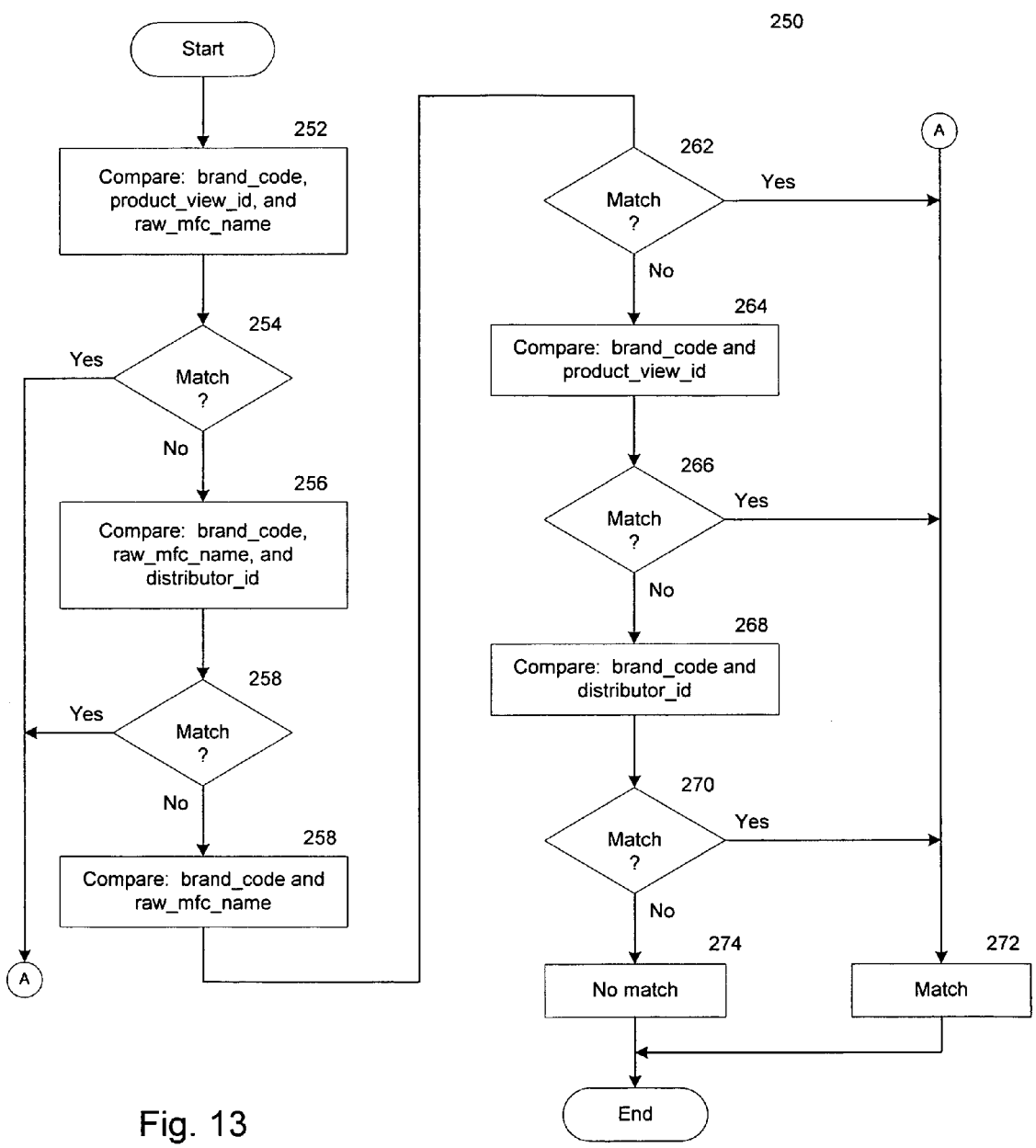
FIG. 13 is a flow diagram of an exemplary method for matching a combination of fields for a manufacturer, according to an embodiment of the present invention.

FIG. 13 is a flow diagram of an exemplary method 250 for matching a combination of fields for a manufacturer, according to an embodiment of the present invention. In one embodiment, method 250 may correspond to one aspect of operation for combination matcher module 70 of data analysis component 34 and can be performed for an unidentified manufacturer specified in raw data.

Method 250 begins at step 252 where combination matcher module 70 compares values in various fields for the manufacturer under consideration against multiple sets of values for the following combination of fields: brand code, product view identifier, and raw manufacturer name. At step 254, for all of these fields, combination matcher module 70 determines whether the values of any set exactly match the values of the manufacturer under consideration. If so, then method 250 moves to step 272 where combination matcher module 70 generates an indicator that there is a "match" for the manufacturer under consideration, after which method 250 ends.

Alternatively, if at step 254 it is determined that none of the sets exactly match the manufacturer under consideration in that particular combination of fields, then at step 206 combination matcher module 70 compares values for the manufacturer under consideration against multiple sets of values for the following combination of fields: brand code, raw manufacturer name, and distributor identifier. At step 258, for all of these fields, combination matcher module 70 determines whether the values of any set exactly match the values of the manufacturer under consideration. If so, then method 250 moves to step 272 where combination matcher module 70 generates an indicator that there is a "match" for the manufacturer under consideration, after which method 250 ends.

Otherwise, if at step 258 it is determined that none of the sets exactly match the manufacturer under consideration in that particular combination of fields, then at step 260 combination matcher module 70 compares values for the manufacturer under consideration against multiple sets of values for the following combination of fields: brand code and raw manufacturer name. At step 262, for all of these fields, combination matcher module 70 determines whether the values of any set exactly match the values of the manufacturer under consideration. If so, then method 250 moves to step 272 where combination matcher module 70 generates an indicator that there is a "match" for the manufacturer under consideration, after which method 250 ends.

On the other hand, if at step 262 it is determined that none of the sets exactly match the manufacturer under consideration in that particular combination of fields, then at step 264 combination matcher module 70 compares values for the manufacturer under consideration against multiple sets of values for the following combination of fields: brand code and product view identifier. At step 266, for all of these fields, combination matcher module 70 determines whether the values of any set exactly match the values of the manufacturer under consideration. If so, then method 250 moves to step 272 where combination matcher module 70 generates an indicator that there is a "match" for the manufacturer under consideration, after which method 250 ends.

Otherwise, if at step 266 it is determined that none of the sets exactly match the manufacturer under consideration in that particular combination of fields, then at step 268 combination matcher module 70 compares values for the manufacturer under consideration against multiple sets of values for the following combination of fields: brand code and distributor identifier. At step 270, for all of these fields, combination matcher module 70 determines whether the values of any set exactly match the values of the manufacturer under consideration. If so, then method 250 moves to step 272 where combination matcher module 70 generates an indicator that there is a "match" for the manufacturer under consideration, after which method 250 ends.

Alternatively, if at step 270 it is determined that none of the sets exactly match the manufacturer under consideration in that particular combination of fields, then at step 274 combination matcher module 70 generates an indicator that there is a "no match" for the manufacturer under consideration. Method 250 ends.

Method for Generating Guesses

Figure 14:
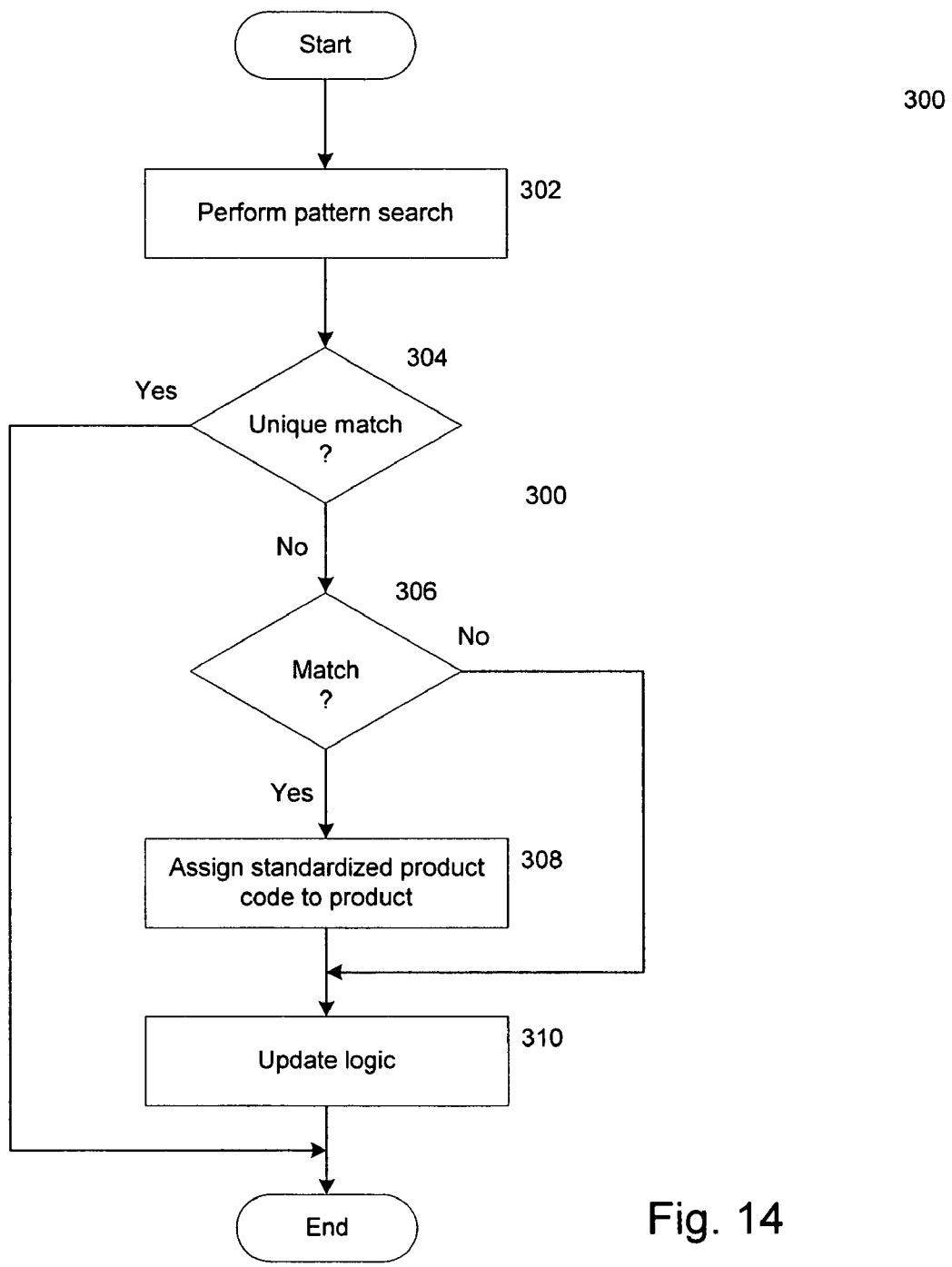
FIG. 14 is a flow diagram of an exemplary method for generating a guess as to the identity of a product, according to an embodiment of the present invention.

FIG. 14 is a flow diagram of an exemplary method 300 for generating a guess as to the identity of a product, according to an embodiment of the present invention. In one embodiment, method 300 may correspond to the operation of guesser module 72 of data analysis component 34 and can be performed for a product specified in raw data.

Method 300 begins at step 302 where guesser module 72 performs a pattern match for the product under consideration. The pattern match is a threshold-based pattern comparison of various fields. In a pattern match, for a number of fields, the values for a product under consideration are compared against the values of various known products to determine the similarity therebetween. A separate fraction may be assigned to indicate the similarity of values for each field. For at least some of the known products, guesser module 72 may generate a measure of confidence which indicates the overall similarity of the product under consideration against a particular known product. The measure of confidence can be a normalized value (between 0% and 100%) that is monotonically related to similarity. A method for performing a pattern match is described below in more detail.

The pattern match may yield a number of "matches" for the product under consideration. A match is defined as a known product with a confidence measure that lies above a predetermined threshold (e.g., 80%). A match may be considered to be a "unique match" if one of the following two conditions are met: (a) the confidence measure for the match is the highest possible value (e.g., 100%) or (b) the confidence measure for the match is above a threshold (e.g., 90%) higher than the threshold for a simple match, and the next best match produced by the pattern match has a confidence measure which is significantly lower. The higher threshold for a unique match, which is still below the highest possible value, recognizes that the data for a product under consideration may be slightly "corrupted" due to random errors (e.g., typos, scanning errors, etc.). The higher threshold for unique matches treats such random errors as inconsequential.

At step 304, in light of the results of the pattern match, guesser module 72 determines whether there is a unique match for the product under consideration. If a known product is a unique match for the product under consideration, a standardized product code for that known product can be assigned to the product under consideration and method 300 ends. Alternatively, if no known product is a unique match for the product under consideration, then at step 306 guesser module 72 determines whether there is a simple match for the product under consideration. A simple match signifies a sufficiently high correlation between the product under consideration and a known product, but the differences are greater than those expected from point-wise or random errors (e.g., typographical errors). Such differences may be attributable to, for example, abbreviations (e.g., "breaded chx breast" for "breaded chicken breast").

Accordingly, if it is determined at step 306 that there is a match for the product under consideration, method 300 moves to step 310 where the logic of product data standardization system 10 is updated to reflect the match. For example, a "match" between the product under consideration and a known product is sufficient for a "signature match" of the two products. Thus, the logic of signature matcher module 62 in data receiving component 30 can be updated accordingly. In the future, data analysis component 34 will then be able to immediately assign a standardized product code to any product having the same raw description or "signature" as the product currently under consideration. Afterwards, method 300 ends.

Otherwise, if it is determined at step 306 that there is no match for the product under consideration, then there are substantial differences, or uniqueness was not satisfied, between the received data for that product and the data for any known products. At step 308, using the guesses and corresponding confidence measures for the product under consideration, product data standardization system 10 assigns a standardized product code to the product. In one embodiment, guesser module 72 may display various information to an analyst to assist in the assignment. After a standardized product code has been assigned to the product under consideration, the logic of data analysis component 34 is updated to reflect the assignment at step 310. Thus, in the future, data analysis component 34 will be able to immediately assign a standardized product code to any product having the same data as the product currently under consideration. Method 300 then ends.

Method for Pattern Match

Figure 15:
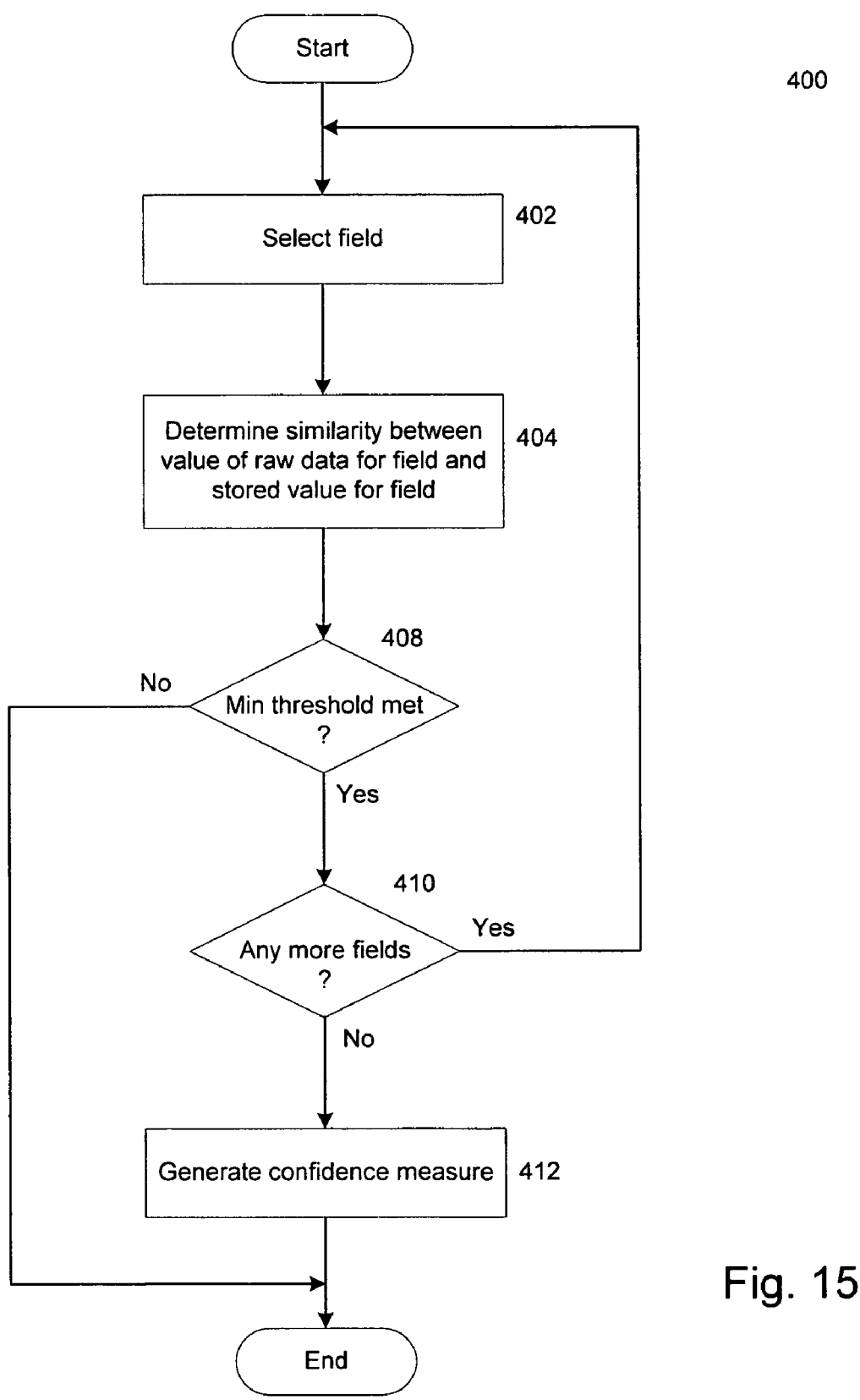
FIG. 15 is a flow diagram of an exemplary method for performing a pattern match, according to an embodiment of the present invention.

FIG. 15 is a flow diagram of an exemplary method 400 for performing a pattern match, according to an embodiment of the present invention. In one embodiment, method 400 may correspond to one aspect of the operation of guesser module 72 of data analysis component 34. Method 400 considers a product specified in raw data received by product data standardization system 10. As described herein, this raw data may be parsed into a number of distinct fields (e.g., product name, product number, manufacturer name, manufacturer number, brand code, distributor name, distributor number, packing size, etc.) with a similarity value computed for each field. Method 400 implements a sequential comparison of each field and computes a single, composite value for the set of fields. This single composite value is an overall measure of similarity of the raw data with a particular known product.

Method 400 begins at step 402 where a field is selected. At step 404, for this field, guesser module 72 determines the similarity between a data field of the product under consideration against the analogous field of the known product. In one embodiment, this is accomplished by a pattern matching routine that computes the fractional similarity between the two fields. In one embodiment, this fraction may have a numerical value between zero and one, with a higher numerical value generally indicating more similarity.

At step 408, guesser module 72 determines whether the numerical value of the fraction meets a minimum threshold for the relevant field. If the minimum threshold is not met, method 400 ends. The use of a minimum threshold for each field recognizes that if there is not sufficient similarity between the values of the product under consideration and the known product, then there is no reason to proceed further. For example, if the numerical value for a product name field is a relatively low, it is very likely that the product under consideration is not the same as the known product; accordingly, the package size field does not need to be considered.

If at step 408 it is determined that the minimum threshold has been met, then at step 410 guesser module 72 determines whether there are any other fields which should be considered. If there is another field, then method 400 returns to step 402 where the next field is selected. Steps 402 through 410 are repeated for each relevant field until either the numerical value for a particular field does not meet the minimum threshold for that field or there is no other field to be considered.

At step 412, guesser module 72 generates a confidence measure representing the similarity between the product under consideration and the known product. In one embodiment, the confidence measure can be calculated by weighting the assigned fraction for each field and aggregating the weighted values. As described herein, the confidence measure can be a normalized value (between 0% and 100%) that is monotonically related to similarity. Method 400 then ends.

With the computer system and method described herein, the present invention standardizes the raw data generated by diverse data sources during the movement of products across various supply chains, for example, in the food service industry. In the standardized product data, like products are identified by the same identifier or description. With the standardized product data, participants in the food service industry, including manufacturers, distributors, and operators, are able to optimize efficiency in their operations, for example, in the areas of marketing, distribution, and purchasing. Accordingly, the present invention enables streamlining of the supply chains for products in the food service industry.

Although particular embodiments of the present invention have been shown and described, it will be obvious to those skilled in the art that changes and modifications may be made without departing from the present invention in its broader aspects, and therefore, the appended claims are to encompass within their scope all such changes and modifications that fall within the true scope of the present invention.

What is claimed is:

1. A computer system for generating standardized product data, the computer system comprising:
   a database operable to maintain data for a plurality of known products, each known product associated with a respective standardized product code; and
   a processing facility coupled to the database, the processing facility operable to receive raw data for an unidentified product from a plurality of diverse data sources each of which has its own separate identifier for the unidentified product, to compare the raw data for the unidentified product against the data for the plurality of known products, and if there is a match between the raw data for the unidentified product and the data for one of the plurality of known products, to assign the respective standardized product code of the matching known product to the unidentified products,
   wherein the raw data comprises a raw description for the unidentified product the data maintained in the database comprises a separate stored description for each of the plurality of known products, and the processing facility is operable to compare the raw description for the unidentified product against the stored descriptions for each of the plurality of known products.

2. The computer system of claim 1 wherein the processing facility is operable to parse the raw data into a number of separate fields values for the unidentified product.

3. The computer system of claim 1 wherein the processing facility is operable to generate at least one guess as to a known product which is a possible match for the unidentified product.

4. The computer system of claim 3 wherein the processing facility is operable to generate a confidence measure for the at least one guess.

5. The computer system of claim 1 further comprising an interface coupled to the processing facility, the interface operable to present the assigned standardized product code to an analyst for auditing.

6. The computer system of claim 1 wherein the processing facility is further operable to update the database with the raw data for the unidentified product, in order to improve future data comparisons.

7. The computer system of claim 1 wherein, if there is no match between the raw data for the unidentified product and the data for any of the plurality of known products, the processing facility is further operable to create a new standardized product code and assign the new standardized product code to the unidentified product.

8. A method performed on a computer system for generating standardized product data, the method comprising:
   maintaining data for a plurality of known products, each known product associated with a respective standardized product code;
   receiving raw data for an unidentified product from a plurality of diverse data sources, each data source having its own separate identifier for the unidentified product;
   comparing the raw data for the unidentified product against the data for the plurality of known products; and
   if there is a match between the raw data for the unidentified product and the data for one of the plurality of known products, assigning the respective standardized product code of the matching known product to the unidentified product
   wherein the raw data comprises a raw description for the unidentified product and the maintained data comprises a separate stored description for each of the plurality of known products, and wherein comparing comprises comparing the raw description for the unidentified product against the stored descriptions for each of the plurality of known products.

9. The method of claim 8 comprising presenting the assigned standardized product code to an analyst for auditing.

10. The method of claim 8 comprising parsing the raw data into a number of separate fields values for the unidentified product.

11. The method of claim 8 comprising generating at least one guess as to a known product which is a possible match for the unidentified product.

12. The method of claim 11 comprising presenting the at least one guess to an analyst for assigning a standardized product code to the unidentified product.

13. The method of claim 11 wherein the raw data comprises a number of field values for the unidentified product and the maintained data comprises separate field values for each of the plurality of known products, and wherein generating comprises performing a pattern comparison of the field values for the unidentified product against the field values for each known product.

14. The method of claim 8 further comprising the step of updating the database with the raw data for the unidentified product, in order to improve future data comparisons.

15. The method of claim 8 further comprising the steps of:
   if there is no match between the raw data for the unidentified product and the data for any of the plurality of known products, creating a new standardized product code; and
   assigning the new standardized product code to the unidentified product.

16. A computer system for generating standardized product data, the computer system comprising:
   a database operable to maintain data for a plurality of known products, each known product associated with a respective standardized product code, the data maintained in the database comprising a separate stored description and set of field values for each of the plurality of known products;
   a processing facility coupled to the database and operable to:
      receive raw data for an unidentified product from a plurality of diverse data sources each of which has its own separate identifier for the unidentified product, the raw data comprising a raw description and set of field values for the unidentified product,
      compare the raw description for the unidentified product against the stored descriptions for each of the plurality of known products,
      if the raw description for the unidentified product does not match any of the stored descriptions for the plurality of known products, compare a predetermined combination of the field values for the unidentified product against corresponding field values for each of the plurality of known products, and
      if the raw description for the unidentified product matches a stored description for one of the plurality of known products, or if all of the field values for the unidentified product match the corresponding field values for one of the plurality of known products for the predetermined combination, assign the respective standardized product code of the matching known product to the unidentified product.

17. The computer system of claim 16 wherein the processing facility is operable to parse the raw data into the fields values for the unidentified product.

18. The computer system of claim 16 comprising an interface coupled to the processing facility, the interface operable to present the assigned standardized product code to an analyst for auditing.

19. The computer system of claim 16 wherein the processing facility is operable to generate at least one guess as to a known product which is a possible match for the unidentified product.

20. The computer system of claim 19 wherein the processing facility is operable to generate a confidence measure for the at least one guess.

21. The computer system of claim 20 comprising an interface coupled to the processing facility, the interface operable to present the at least one guess and confidence measure to an analyst for assignment of a standardized product code.

22. A method performed on a computer system for generating standardized product data, the method comprising:
   receiving raw data for an unidentified product from a plurality of diverse data sources each of which has its own separate identifier for the unidentified product, the raw data comprising a raw description and set of field values for the unidentified product;
   comparing the raw description for the unidentified product against the stored descriptions for each of the plurality of known products;
   if the raw description for the unidentified product does not match any stored description, comparing a predetermined combination of the field values for the unidentified product against corresponding field values for each of the plurality of known products; and if the raw description for the unidentified product matches a stored description for one of the plurality of known products, or if all of the field values for the unidentified product match the corresponding field values for one of the plurality of known products for the predetermined combination, assigning the respective standardized product code of the matching known product to the unidentified product.

23. A computer system for generating standardized product data, the computer system comprising:
   a database operable to maintain data for a plurality of known products, each known product associated with a respective standardized product code; and
   a processing facility coupled to the database, the processing facility operable to receive raw data for an unidentified product from a plurality of diverse data sources each of which has its own separate identifier for the unidentified product, to compare the raw data for the unidentified product against the data for the plurality of known products, and if there is a match between the raw data for the unidentified product and the data for one of the plurality of known products, to assign the respective standardized product code of the matching known product to the unidentified product,
   wherein the raw data comprises a number of field values for the unidentified product, the data maintained in the database comprises separate field values for each of the plurality of known products, and the processing facility is to compare a predetermined combination of the field values for the unidentified product against corresponding field values for each of the plurality of known products.

24. The computer system of claim 23 wherein the processing facility is operable to parse the raw data into a number of separate fields values for the unidentified product.

25. The computer system of claim 23 wherein the processing facility is operable to generate at least one guess as to a known product which is a possible match for the unidentified product.

26. The computer system of claim 25 wherein the processing facility is operable to generate a confidence measure for the at least one guess.

27. The computer system of claim 23 further comprising an interface coupled to the processing facility, the interface operable to present the assigned standardized product code to an analyst for auditing.

28. The computer system of claim 23 wherein the processing facility is further operable to update the database with the raw data for the unidentified product, in order to improve future data comparisons.

29. The computer system of claim 23 wherein, if there is no match between the raw data for the unidentified product and the data for any of the plurality of known products, the processing facility is further operable to create a new standardized product code and assign the new standardized product code to the unidentified product.

30. A method performed on a computer system for generating standardized product data, the method comprising:
   maintaining data for a plurality of known products, each known product associated with a respective standardized product code;
   receiving raw data for an unidentified product from a plurality of diverse data sources, each data source having its own separate identifier for the unidentified product;
   comparing the raw data for the unidentified product against the data for the plurality of known products; and
   if there is a match between the raw data for the unidentified product and the data for one of the plurality of known products, assigning the respective standardized product code of the matching known product to the unidentified product,
   wherein the raw data comprises a number of field values for the unidentified product and the maintained data comprises separate field values for each of the plurality of known products, and wherein comparing comprises comparing a predetermined combination of the field values for the unidentified product against corresponding field values for each of the plurality of known products.

31. The method of claim 30 comprising presenting the assigned standardized product code to an analyst for auditing.

32. The method of claim 30 comprising parsing the raw data into a number of separate fields values for the unidentified product.

33. The method of claim 30 comprising generating at least one guess as to a known product which is a possible match for the unidentified product.

34. The method of claim 33 comprising presenting the at least one guess to an analyst for assigning a standardized product code to the unidentified product.

35. The method of claim 33 wherein generating comprises performing a pattern comparison of the field values for the unidentified product against the field values for each known product.

36. The method of claim 30 further comprising the step of updating the database with the raw data for the unidentified product, in order to improve future data comparisons.

37. The method of claim 30 further comprising the steps of:
   if there is no match between the raw data for the unidentified product and the data for any of the plurality of known products, creating a new standardized product code; and
   assigning the new standardized product code to the unidentified product.

* * * * *